US011041466B2

(12) United States Patent
Lee et al.

(10) Patent No.: US 11,041,466 B2
(45) Date of Patent: Jun. 22, 2021

(54) GAS PROCESSING SYSTEM AND VESSEL INCLUDING THE SAME

(71) Applicant: HYUNDAI HEAVY INDUSTRIES CO., LTD., Ulsan (KR)

(72) Inventors: Sang Bong Lee, Ulsan (KR); Dong Jin Lee, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 0 days.

(21) Appl. No.: 15/772,705

(22) PCT Filed: Jul. 7, 2016

(86) PCT No.: PCT/KR2016/007404
§ 371 (c)(1),
(2) Date: May 1, 2018

(87) PCT Pub. No.: WO2017/078244
PCT Pub. Date: May 11, 2017

(65) Prior Publication Data
US 2018/0320637 A1  Nov. 8, 2018

(30) Foreign Application Priority Data

Nov. 5, 2015  (KR) .................. 10-2015-0155365
Mar. 31, 2016  (KR) .................. 10-2016-0039642

(51) Int. Cl.
*F02B 75/08* (2006.01)
*F02M 25/08* (2006.01)
(Continued)

(52) U.S. Cl.
CPC ........... *F02M 25/089* (2013.01); *B63B 25/16* (2013.01); *B63H 21/38* (2013.01); *F02D 19/022* (2013.01);
(Continued)

(58) Field of Classification Search
CPC ...... F17C 2223/0115; F17C 2223/0123; F17C 2223/043; F17C 2225/0123; F17C 2227/0157
(Continued)

(56) References Cited

U.S. PATENT DOCUMENTS 3,885,394 A   5/1975  Witt et al.
6,460,350 B2  10/2002  Johnson et al.
(Continued)

FOREIGN PATENT DOCUMENTS

EP   1596122 A2   11/2005
EP   2685079 A1    1/2014
(Continued)

OTHER PUBLICATIONS

Matthias Hagedorn: "LNG Engines Specifications and Economics", LNG shipping Rostock; Oct. 13, 2014; 53 pages.
(Continued)

*Primary Examiner* — John Kwon

(57) ABSTRACT

A gas processing system according to an embodiment of the present invention controls inflow fuel pressure of a low pressure demand source according to an operation or a non-operation of a high pressure demand source and the low pressure demand source.

14 Claims, 8 Drawing Sheets

(51) Int. Cl.
   *B63B 25/16* (2006.01)
   *B63H 21/38* (2006.01)
   *F02M 21/02* (2006.01)
   *F02M 21/06* (2006.01)
   *F25J 1/02* (2006.01)
   *F25J 1/00* (2006.01)
   *F02D 19/02* (2006.01)
   *F17C 9/02* (2006.01)
   *B63J 99/00* (2009.01)

(52) U.S. Cl.
   CPC .... *F02M 21/0215* (2013.01); *F02M 21/0218* (2013.01); *F02M 21/0245* (2013.01); *F02M 21/06* (2013.01); *F17C 9/02* (2013.01); *F25J 1/0025* (2013.01); *F25J 1/0072* (2013.01); *F25J 1/0202* (2013.01); *F25J 1/023* (2013.01); *F25J 1/0204* (2013.01); *F25J 1/0245* (2013.01); *F25J 1/0277* (2013.01); *B63J 2099/003* (2013.01); *F17C 2221/035* (2013.01); *F17C 2223/0161* (2013.01); *F17C 2227/0157* (2013.01); *F17C 2265/066* (2013.01); *F17C 2270/0105* (2013.01); *F25J 2215/62* (2013.01); *F25J 2215/64* (2013.01); *F25J 2230/24* (2013.01); *F25J 2230/30* (2013.01); *Y02T 10/30* (2013.01)

(58) Field of Classification Search
   USPC ............ 123/1, 516, 518, 520; 62/48.1, 48.2, 62/50.4, 52.1, 53.2
   See application file for complete search history.

(56) References Cited

U.S. PATENT DOCUMENTS

| | | | | |
|---|---|---|---|---|
| 8,499,569 | B2* | 8/2013 | Van Tassel | B63B 25/16 62/48.2 |
| 10,364,013 | B2* | 7/2019 | Shin | F17C 9/02 |
| 2006/0053806 | A1* | 3/2006 | Tassel | B63B 25/16 62/48.1 |
| 2009/0266086 | A1* | 10/2009 | Lee | F17C 9/02 62/48.1 |
| 2012/0017639 | A1* | 1/2012 | Peterson | C10L 3/02 62/611 |
| 2014/0041398 | A1* | 2/2014 | Aoki | F17C 13/004 62/48.2 |
| 2014/0352330 | A1* | 12/2014 | Baek | F17C 9/02 62/48.1 |
| 2015/0316208 | A1 | 11/2015 | Bae et al. | |
| 2016/0356424 | A1* | 12/2016 | Lee | F25J 1/004 |
| 2018/0170503 | A1* | 6/2018 | Shin | B63H 21/38 |
| 2018/0313497 | A1 | 11/2018 | De Nardis | |

FOREIGN PATENT DOCUMENTS

| | | |
|---|---|---|
| EP | 2913509 A1 | 9/2015 |
| EP | 2913510 A1 | 9/2015 |
| EP | 2933183 A1 | 10/2015 |
| JP | 2003-252294 A | 9/2003 |
| JP | 4073445 62 | 2/2008 |
| JP | 2014-508889 A | 4/2014 |
| JP | 2014511469 A | 5/2014 |
| JP | 2015-500759 A | 1/2015 |
| JP | 2015-505941 A | 2/2015 |
| JP | 2015-074418 A | 4/2015 |
| KR | 1020030073975 A | 9/2003 |
| KR | 1020060122155 A | 11/2006 |
| KR | 1020070042420 A | 4/2007 |
| KR | 10-0726293 61 | 6/2007 |
| KR | 1020080031611 A | 4/2008 |
| KR | 10-0845819 B1 | 7/2008 |
| KR | 20-0441890 Y1 | 9/2008 |
| KR | 1020100111139 A | 5/2012 |
| KR | 020120107835 A | 10/2012 |
| KR | 1020130044019 A | 5/2013 |
| KR | 10-1309631 B1 | 9/2013 |
| KR | 1020140075595 A | 6/2014 |
| KR | 1020140076490 A | 6/2014 |
| KR | 10-1480255 B1 | 12/2014 |
| KR | 1020150013399 A | 2/2015 |
| KR | 1020150017424 A | 2/2015 |
| KR | 1020150019522 A | 2/2015 |
| KR | 1020150028494 A | 3/2015 |
| KR | 10-1525728 B1 | 5/2015 |
| KR | 1020150063008 A | 6/2015 |
| KR | 10-1537278 B1 | 7/2015 |
| KR | 1020150092771 A | 8/2015 |
| WO | 2015/053126 A1 | 4/2015 |

OTHER PUBLICATIONS

Japanese Office Action dated Apr. 9, 2019; Appln. 2018-520516.
International Search Report and Written Opinion dated Oct. 31, 2016; PCT/KR2016/007404.
The Extended European Search Report dated May 13, 2019; Appln. No. 16862263.7.
The Extended European Search Report dated May 24, 2019; Appln. No. 16862264.5.
Japanese Office Action dated Jun. 4, 2019; Appln. No. 2018-520397.
USPTO NFOA dated Nov. 25, 2019 in connection with U.S. Appl. No. 15/772,720.
USPTO NFOA dated Apr. 15, 2020 in connection with U.S. Appl. No. 15/772,720.
Japanese Notice of Allowance dated Mar. 23, 2021; Appln. No. 2018-520397.

* cited by examiner

US 11,041,466 B2

GAS PROCESSING SYSTEM AND VESSEL INCLUDING THE SAME

TECHNICAL FIELD

The present invention relates to a gas processing system and a vessel including the same.

BACKGROUND ART

Recently, according to the technology development, liquefied gas, such as liquefied natural gas and a liquefied petroleum gas, is widely used, substituting gasoline or diesel.

The liquefied natural gas is obtained by cooling and liquefying methane obtained by refining natural gas collected from a gas field, and is colorless and transparent liquid, has little pollutants, and has high calorie, so that the liquefied natural gas is very excellent fuel. In the meantime, the liquefied petroleum gas is fuel obtained by compressing gas which has propane ($C_3H_8$) and butane ($C_4H_{10}$) collected from an oilfield together with petroleum as main components at a normal temperature and making the compressed gas into liquid. The liquefied petroleum gas is colorless and odorless, like the liquefied natural gas, and is widely used as fuel for household, business use, industrial use, a car, and the like.

The liquefied gas is stored in a liquefied gas storage tank installed on the ground or a liquefied gas storage tank provided in a vessel that is a transport means voyaging the sea, the liquefied natural gas is decreased to $1/600$ in volume, and propane of the liquefied petroleum gas is decreased to $1/260$ in volume and butane thereof is decreased to $1/230$ in volume, so that the liquefied gas has an advantage in high storage efficiency. A temperature, pressure, and the like required for driving an engine using the liquefied gas as fuel may be different from a state of the liquefied gas stored in the tank.

Further, when the LNG is stored in a liquid state, heat penetrates to the tank, so that some of the LNG is vaporized and Boil Off Gas (BOG) is generated, and the BOG may cause a problem to a liquefied gas processing system. Because of this, the related art attempts to solve the problem by consuming the BOG by a method of discharging the BOG to the outside and burning the BOG (in the related art, in order to remove a risk in damage to the tank by decreasing pressure of the tank, the BOG is simply discharged to the outside and is processed), but the method causes environment contamination and resource waste.

Recently, as a technology for efficiently processing BOG, a utilization method of re-liquefying the generated BOG and supplying the BOG to an engine and the like is implemented, but despite of the utilization, the BOG is not sufficiently consumed, so that it fails to efficiently utilize a resource.

Ship owners propel vessels by using an MEGI engine that uses LNG as fuel to excellently and effectively respond to the recently carried NOx discharge regulation and environment contamination prevention. However, the MEGI engine has problems in that pressure required for driving an engine is 300 bars which is very high, so that power consumption is huge, a considerable amount of installation cost is required, and a configuration of the system is complex to require a large installation area.

Accordingly, research on an engine which is capable of replacing the MEGI engine is conducted to develop a low-speed two-stroke log pressure injection engine (2sDF or XDF), and a need to development of a fuel supply system using the low-speed two-stroke log pressure injection engine is on the rise.

DISCLOSURE

Technical Problem

The present invention is conceived to improve the related art, and an object of the present invention is to provide a gas processing system which effectively supplies liquefied gas and/or Boil Off Gas (BOG) from a liquefied gas storage tank to a demand source, and a vessel including the same.

Technical Solution

A gas processing system according to the present invention includes: a first demand source which consumes fuel of first pressure; a second demand source which consumes fuel of second pressure that is lower than the first pressure; a BOG compressor which compresses BOG generated in a liquefied gas storage tank; and a controller which determines whether the first demand source operates, and control inflow fuel pressure of the second demand source.

Particularly, the controller may determine a demand source, to which the BOG compressed by the BOG compressor is to be supplied, between the first demand source and the second demand source, and perform variable frequency drive control on the BOG compressor so that the BOG compressor discharges the BOG with the first pressure or the second pressure.

Particularly, the gas processing system may further include: a first supply line which connects the liquefied gas storage tank and the first demand source and is provided with the BOG compressor; and a second supply line which is branched in a downstream side of the BOG compressor on the first supply line to be connected with the second demand source, and is not provided with a separate decompressing means, in which when the first demand source is erroneously operated or an operation of the first demand source is stopped, the controller may perform the variable frequency drive control on the BOG compressor so as to discharge the BOG with the second pressure.

Particularly, the gas processing system may further include: a first line which connects the liquefied gas storage tank and the first demand source and the second demand source, and is provided with the BOG compressor; and a second line which connects a rear end and a front end of the BOG compressor, in which the controller may determine a demand source, to which the BOG compressed by the BOG compressor is to be supplied, between the first demand source and the second demand source, and control a flow of liquefied gas or the BOG flowing in the first line or the second line.

Particularly, when the first demand source is erroneously operated or an operation of the first demand source is stopped, the controller may control at least a part of the BOG discharged from the BOG compressor to flow in the second line to make that pressure of the BOG discharged from the BOG compressor become the second pressure.

Particularly, the first line may include: a first BOG supply line which connects the liquefied gas storage tank and the first demand source and is provided with the BOG compressor; and a second BOG supply line which is branched in the downstream side of the BOG compressor on the BOG supply line to be connected with the second demand source, and is not provided with a separate decompressing means, and when the first demand source is erroneously operated or an operation of the first demand source is stopped, the controller may control the remaining portion of the BOG discharged from the BOG compressor to be supplied to the second BOG supply line.

Particularly, the gas processing system may further include a flow amount control unit which is provided in an upstream side of the BOG compressor and controls a flow amount of the BOG flowing into the BOG compressor, in which the controller may determine a demand source, to which the BOG compressed by the BOG compressor is to be supplied, between the first demand source and the second demand source, and control the flow amount control unit so that the BOG compressor discharges the BOG with the first pressure or the second pressure.

Particularly, when the first demand source is erroneously operated or an operation of the first demand source is stopped, the controller may control the BOG compressor to discharge the BOG with the second pressure by operating the flow amount control unit so that the flow amount of the BOG flowing into the BOG compressor is decreased.

Particularly, the gas processing system may further include an adjusting valve which is provided in the downstream side of the BOG compressor, in which when the first demand source is erroneously operated or an operation of the first demand source is stopped, the controller may increase the degree of opening of the adjusting valve, operate the flow amount control unit, and enable the second demand source to receive the compressed BOG discharged from the BOG compressor which receives the decreased amount of BOG, and when the first demand source is normally operated, the controller may decrease the degree of opening of the adjusting valve, stop the operation of the flow amount control unit, and then enable the first demand source to receive the compressed BOG discharged from the BOG compressor.

Particularly, the gas processing system may further include: a first supply line which connects the liquefied gas storage tank and the first demand source and is provided with the BOG compressor; a second supply line which is connected with the liquefied gas storage tank and a downstream side of the BOG compressor on the first supply line; and a Forcing vaporizer which is provided on the second supply line, and compulsorily vaporizes liquefied gas stored in the liquefied gas storage tank to generate Forced Boil Off Gas (FBOG), in which the BOG compressor may have a capacity in which it is possible to process all of naturally generated BOG generated in the liquefied gas storage tank in a full load state as a maximum processing capacity.

Particularly, the case where the operation of the first demand source is stopped may be a case where a vessel is anchored at a dock.

Particularly, the first demand source may be a low-speed two-stroke low pressure injection engine.

Particularly, the controller may supply the BOG compressed by the BOG compressor to the second demand source without a separate decompressing means.

Further, a vessel according to an embodiment of the present invention may include the gas processing system.

Advantageous Effects

The gas processing system according to the present invention and the vessel including the same may effectively supply liquefied gas and/or BOG to a demand source from a liquefied gas storage tank, thereby improving stability and reliability of the system.

BEST MODE

Figure 1:
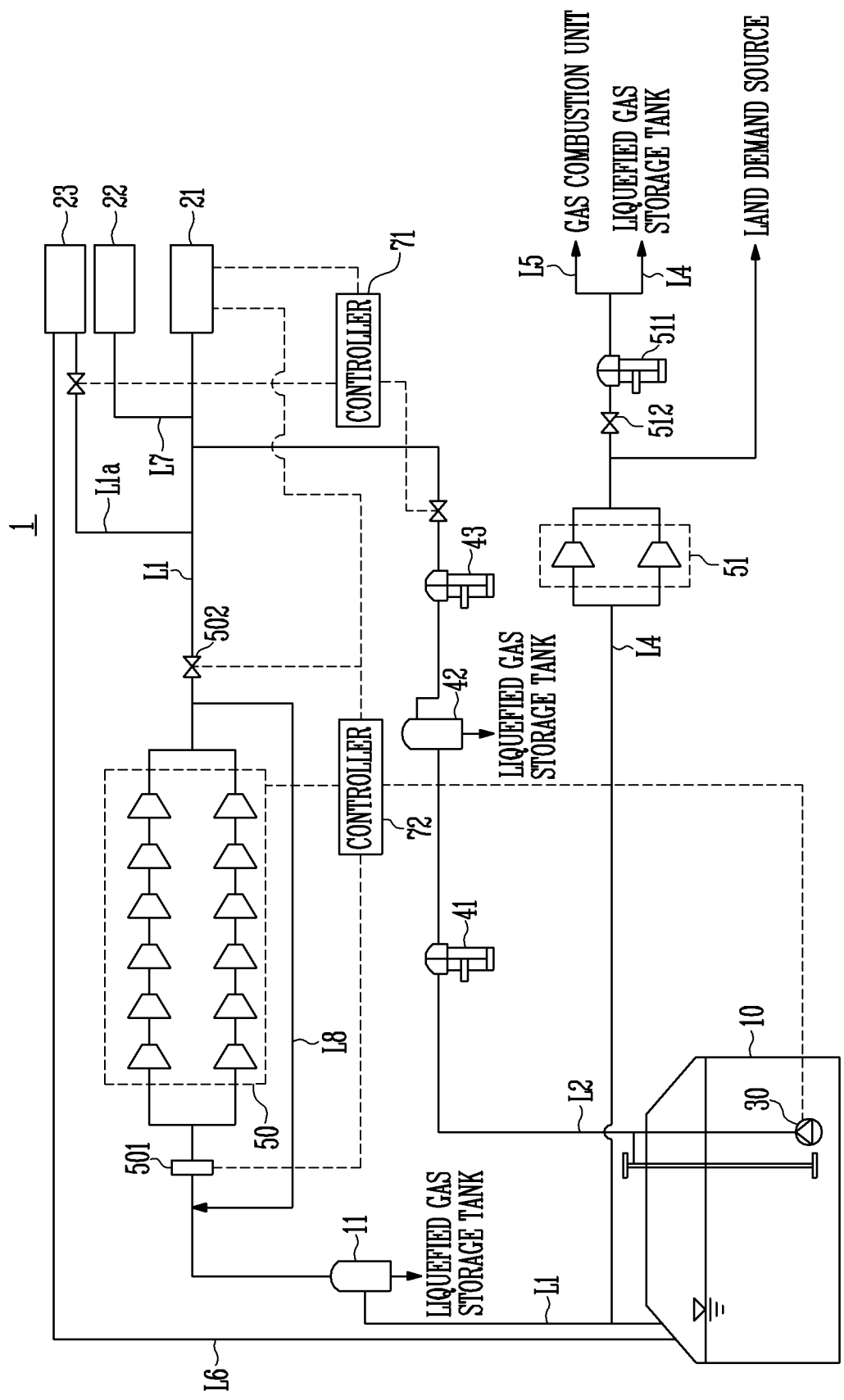
FIG. 1 is a concept diagram of a liquefied gas processing system according to a first embodiment of the present invention.

An object, specific advantages, and novel characteristics of the present invention will be more apparent from the detailed description and exemplary embodiments below in connection with the accompanying drawings. It should be noted that in giving reference numerals to elements of each drawing in the present specification, like reference numerals refer to like elements even though like elements are shown in different drawings. In the following description of the present invention, a detailed description of known functions and configurations incorporated herein is omitted to avoid making the subject matter of the present invention unclear.

Hereinafter, liquefied gas may be Liquefied Petroleum Gas (LPG), Liquefied Natural Gas (LNG), ethane, and the like, and for example, the liquefied gas may mean LNG, and Boil Off Gas (BOG) may mean BOG that is natural vaporized LNG, and the like.

The liquefied gas may be referred regardless of a state change, such as a liquid state, a gas state, a liquid and gas mixed state, a super cooling state, and a supercritical state, and the same applies to the BOG. Further, a processing target of the present invention is not limited to liquefied gas, and may be a liquefied gas processing system and/or a BOG processing system, and it is apparent that the system of each drawing to be described below may be mutually applied.

Hereinafter, embodiments of the present invention will be described in detail with reference to the accompanying drawings.

Figure 2:
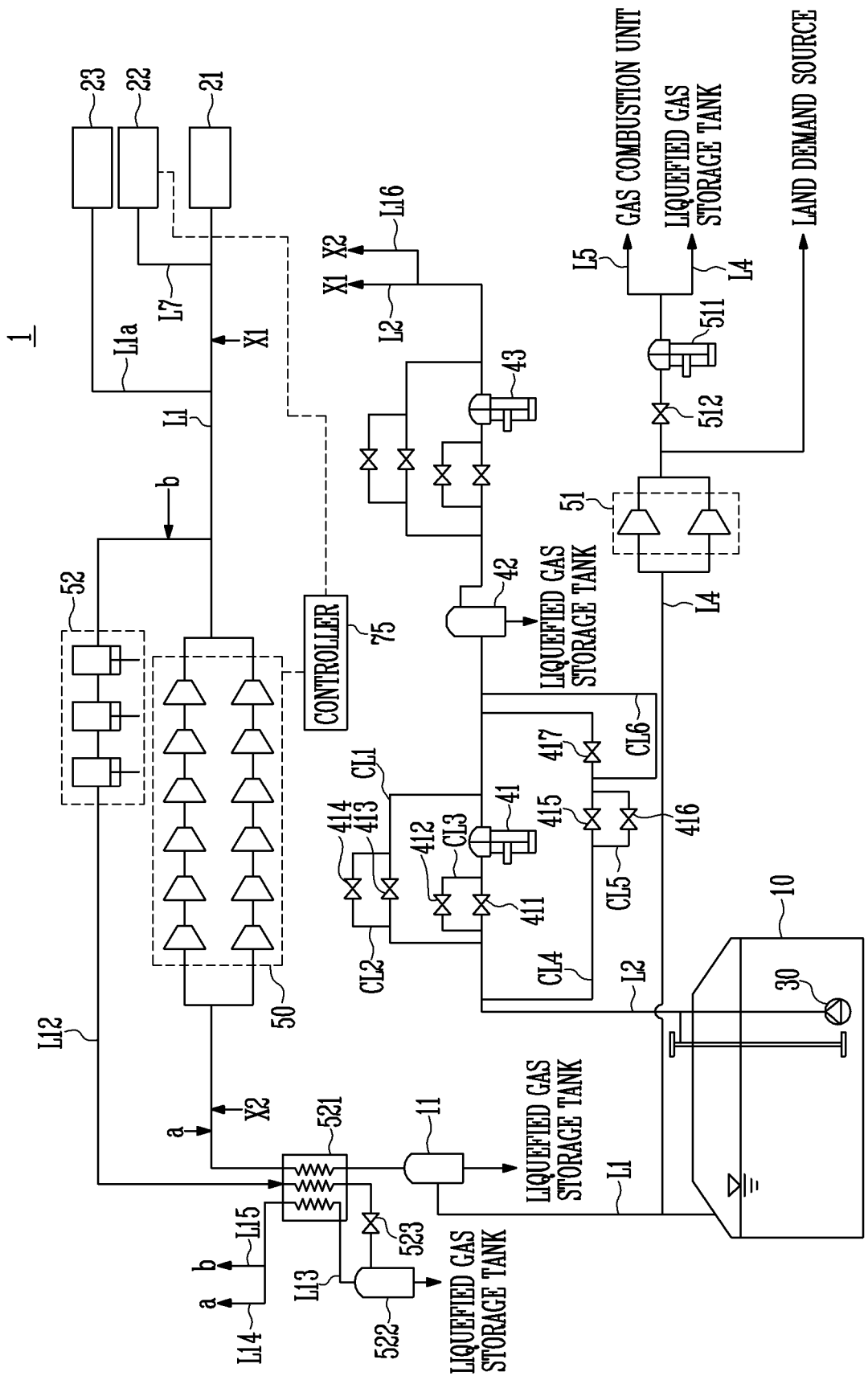
FIG. 2 is a concept diagram of a liquefied gas processing system according to a second embodiment of the present invention.
Figure 3:
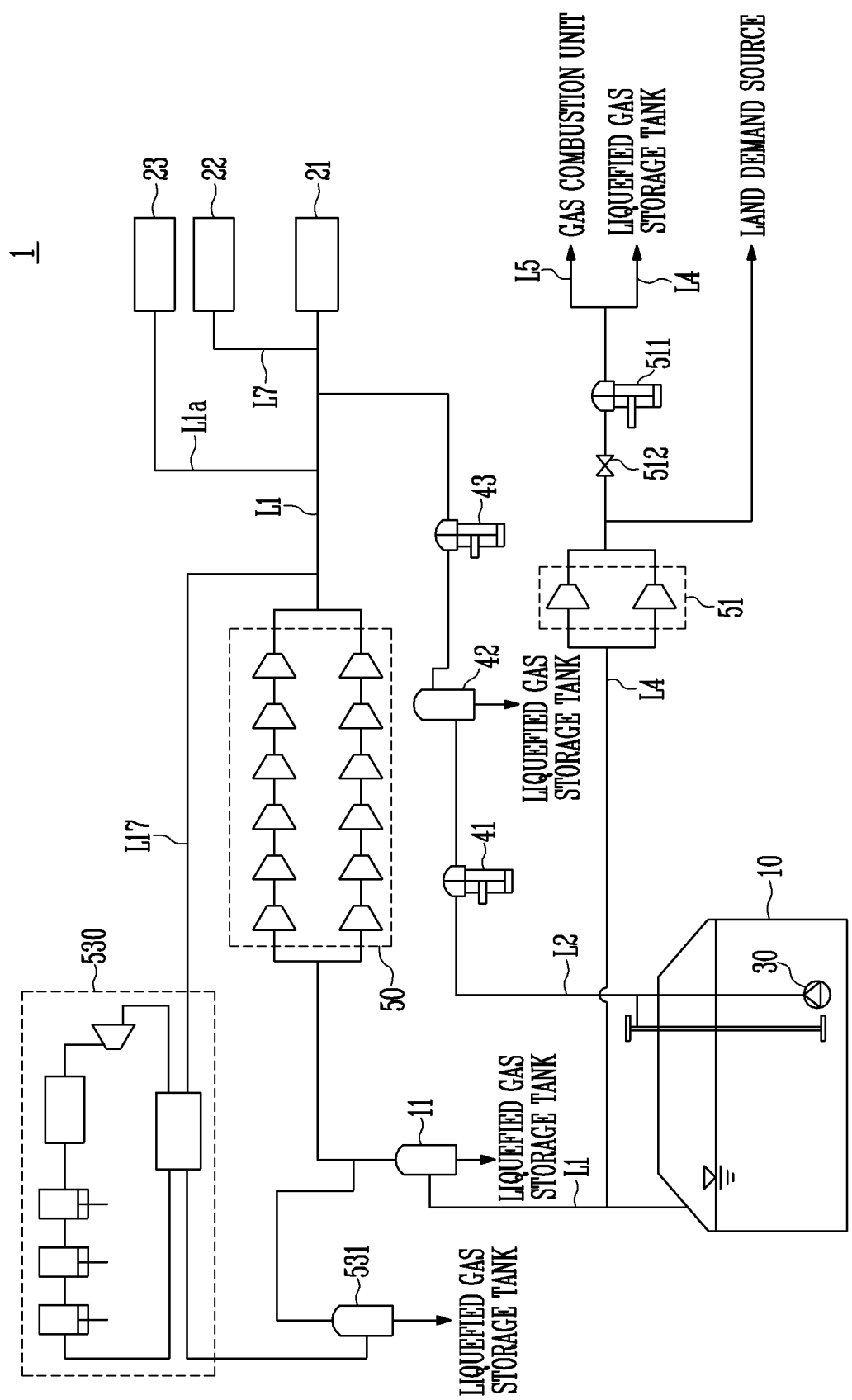
FIG. 3 is a concept diagram of a liquefied gas processing system according to a third embodiment of the present invention.
Figure 4:
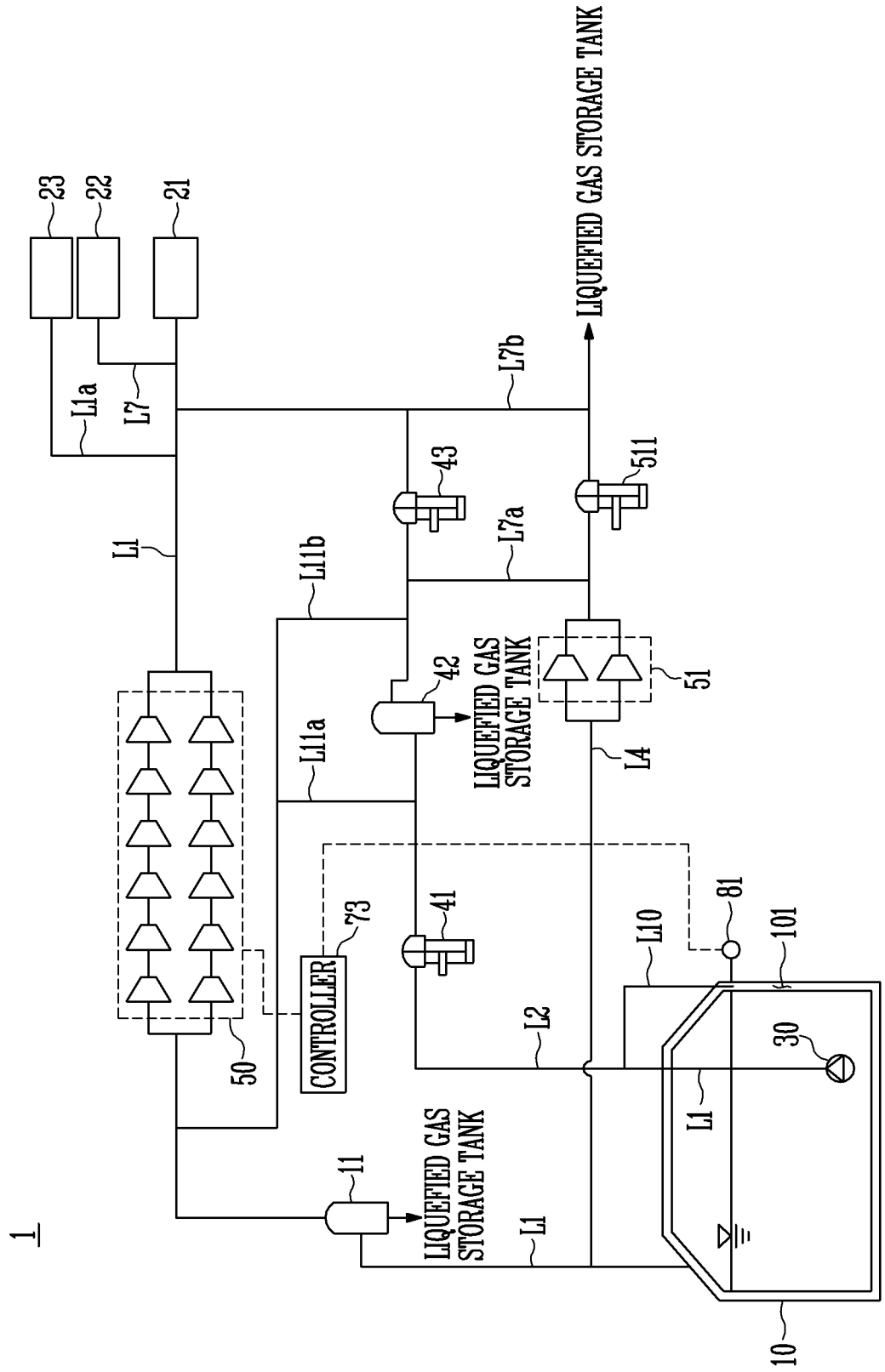
FIG. 4 is a concept diagram of a liquefied gas processing system according to a fourth embodiment of the present invention.
Figure 5:
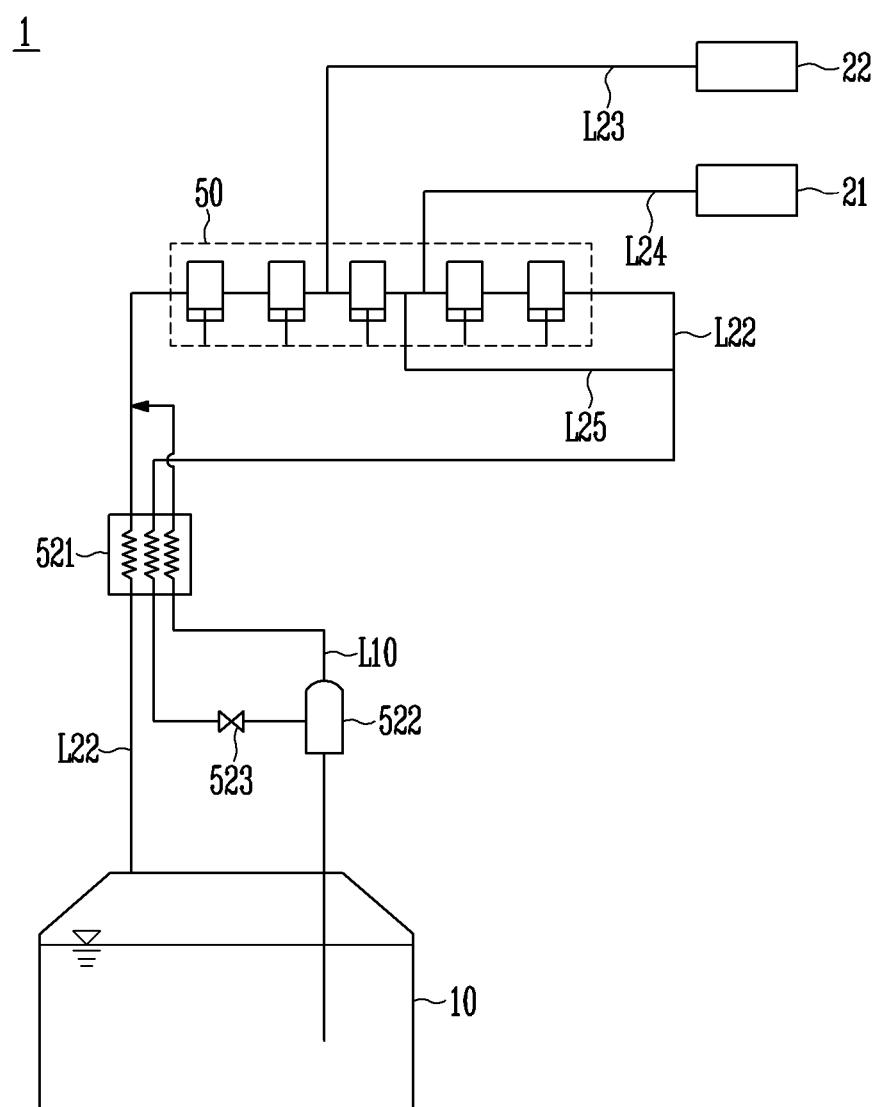
FIG. 5 is a concept diagram of a liquefied gas processing system according to a fifth embodiment of the present invention.
Figure 6:
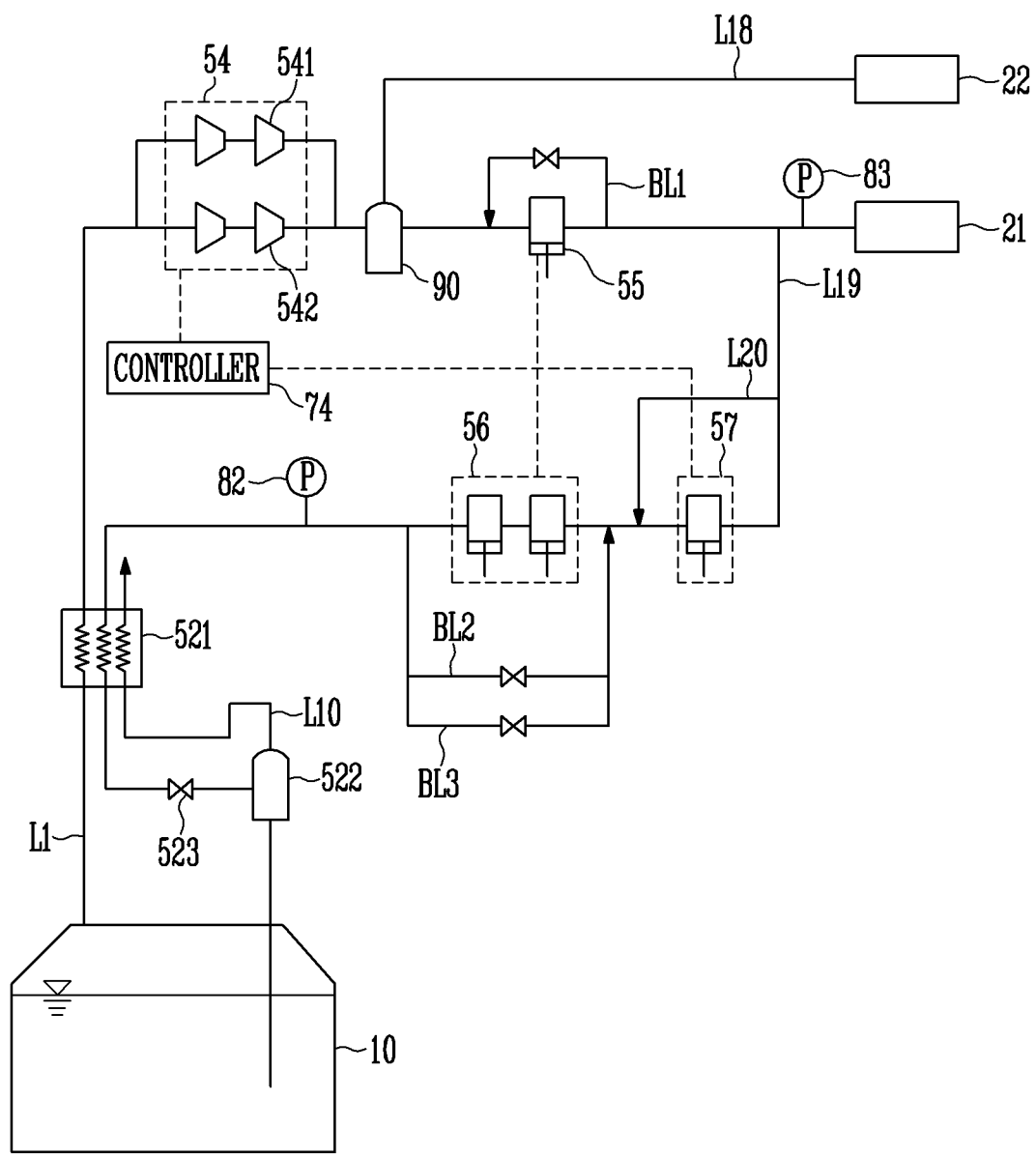
FIG. 6 is a concept diagram of a liquefied gas processing system according to a sixth embodiment of the present invention.

FIG. 1 is a concept diagram of a liquefied gas processing system according to a first embodiment of the present invention, FIG. 2 is a concept diagram of a liquefied gas processing system according to a second embodiment of the present invention, FIG. 3 is a concept diagram of a liquefied gas processing system according to a third embodiment of the present invention, FIG. 4 is a concept diagram of a liquefied gas processing system according to a fourth embodiment of the present invention, FIG. 5 is a concept diagram of a liquefied gas processing system according to a fifth embodiment of the present invention, and FIG. 6 is a concept diagram of a liquefied gas processing system according to a sixth embodiment of the present invention.

Referring to FIGS. 1 to 8, each of the gas processing systems 1 according to embodiments of the present invention may include a liquefied gas storage tank 10, a gas-liquid separator 11, a propulsion engine 21, a generation engine 22, a gas combustion unit 23, a boosting pump 30, a forcing vaporizer 41, a gas-liquid separator 42, a first heater 43, a BOG compressor 50, an 11/D compressor 51, and an LNG vaporizer 60.

Hereinafter, each configuration of the gas processing system 1 according to the embodiment of the present invention will be described, and after the configuration is completely described, each embodiment will be described based on a relation between the configurations of the system. Further, among the configurations illustrated in FIGS. 1 to 8, the configuration that is not described in the description below will be described in the description of each embodiment.

The liquefied gas storage tank 10 is connected with the propulsion engine 21 through a first line L1, and stores liquefied gas or BOG to be supplied to the propulsion engine 21, the generation engine 22, and the gas combustion unit 23.

The liquefied gas storage tank 10 needs to store liquefied gas in a liquid state, and in this case, the liquefied gas storage tank 10 may have a form of a pressure tank. Herein, the liquefied gas storage tank 10 has various forms, and the kind of the liquefied gas storage tank 10 is not limited.

The gas-liquid separator 11 may be provided on the first line L1, and may separate a phase of the BOG received from the liquefied gas storage tank 10.

Particularly, the gas-liquid separator 11 may be provided between the BOG compressor 50 and the liquefied gas storage tank 10 to separate a phase of the BOG received from the liquefied gas storage tank 10 into a liquid phase and a gas phase. The gas phase separated from the gas-liquid separator 11 may be supplied to the BOG compressor 50, and the liquid phase may be returned to the liquefied gas storage tank 10.

The BOG which the BOG compressor 50 receives from the liquefied gas storage tank 10 has a temperature of about −150° C. and pressure of about 1 bar to 2 bars (preferably, 1.03 bar), and a phase of the BOG may not be a phase in which the total amount of BOG is vaporized. Accordingly, the gas-liquid separator 11 may improve driving efficiency of the BOG compressor 50 by supplying only the 130G in the gas phase to the BOG compressor 50, and prevent the waste of the BOG by returning the BOG in the liquid phase to the liquefied gas storage tank 10.

The demand sources 21, 22, and 23 may consume the liquefied gas supplied from the liquefied gas storage tank 10, and may also consume BOG (for example, flash gas or compulsorily generated BOG (Forced BOG)) formed from existing liquefied gas by a separate processing or may also consume BOG (for example, naturally generated BOG) naturally generated in the liquefied gas storage tank 10.

The demand sources 21, 22, and 23 may include the propulsion engine 21, the generation engine 22, and the gas combustion unit 23. However, this is simply the example for easily describing the gas processing system 1 according to the embodiment of the present invention, and the present invention is not limited thereto.

The propulsion engine 21 supplies thrust by using the liquefied gas or the BOG stored in the liquefied gas storage tank 10.

In the propulsion engine 21, a piston (not illustrated) inside a cylinder (not illustrated) reciprocates by the combustion of the liquefied gas, the BOG, or oil, so that a crank shaft (not illustrated) connected to the piston may rotate and a shaft (not illustrated) connected to the crank shaft may rotate. Accordingly, in the propulsion engine 21, a propeller (not illustrated) connected to the shaft rotates during the driving, so that a floating-type offshore structure may move forwardly or backwardly.

The propulsion engine 21 in the embodiment of the present invention may be a low-speed two stroke low pressure gas injection engine, and for example, may be a 2s DF engine (XDF engine) developed by Wartsila Company, and may be driven according to an Otto cycle.

That is, the propulsion engine 21 first compresses air-fuel mixture supplied to the cylinder to a top dead center and makes the air-fuel mixture be completely combusted at a moment at which ignition is occurred by pilot fuel from the outside at the top dead center of the compression to generate explosive power. In this case, a mass ratio of the mixture of air and fuel may be lower than 14.7:1 that is a thin state, so that the propulsion engine 21 may be a form of a lean burn engine.

In this case, as the ignition fuel, Heavy Fuel Oil (HFO) or Marine Diesel Oil (MDO) is used, and a ratio of the ignition fuel and high pressure gas is normally about 1:99, so that the ignition is possible only with the tiny amount of ignition fuel.

The propulsion engine 21 may receive the liquefied gas of 8 bars to 20 bars (preferably, 10 bars) to generate power, and a state of the received liquefied gas may be changed according to a state required by the propulsion engine 21.

Generally, a large vessel generates thrust through the MEGI engine, but in the embodiment of the present invention, the low-speed two-stroke low pressure gas injection engine is used as an engine generating thrust of the vessel, thereby achieving many advantages.

In the MEGI engine, pressure of the supplied fuel required for driving is about 200 bars to 300 bars which is high pressure, and power consumed for driving is about 210 KW to 220 KW (about 215 KW), so that there is a problem in that the considerable amount of power is required.

On the contrast, in the low-speed two-stroke low pressure gas injection engine, pressure of the supplied fuel required for driving is about 8 bars to 20 bars (preferably, 10 bars to 17 bars) which is low pressure, and power consumed for driving is about 13 KW to 17 KW (about 15 KW), so that there is an effect in that it is possible to decrease the large amount of power compared to the MEGI engine.

Further, the MEGI engine has considerable driving pressure, so that there is a problem in that a gas supply system (not illustrated) accompanying for generating required pressure is very complex and occupies a large space. On the contrast, the low-speed two-stroke low pressure gas injection engine has low driving pressure, so that there are advantages in that a fuel supply system is very simple and an occupied space of the fuel supply system is very small.

The generation engine 22 may be an engine for generating electricity or other power. The generation engine 22 may be a heterogeneous fuel engine, for example, a Dual Fuel Diesel Electric (DFDE) engine, and liquefied gas and fuel oil are not mixed and supplied, but liquefied gas and fuel oil may be selectively supplied. This is for the purpose of preventing two materials having different combustion temperatures from being mixed and supplied and preventing efficiency of the engine from deteriorating.

The gas combustion unit 23 refers to a unit combusting BOG for consuming surplus BOG.

The gas combustion unit 23 may process the BOG generated in the liquefied gas storage tank 10, or when the amount of BOG supplied to the propulsion engine 21 or the generation engine 22 is excessively large, the gas combustion unit 23 may additionally process the BOG.

The boosting pump 30 may be provided on a second line L2, and may be installed inside or outside the liquefied gas storage tank 10 and supply the liquefied gas stored in the liquefied gas storage tank 10 to the forcing vaporizer 41. In this case, when the boosting pump 30 is disposed inside the liquefied gas storage tank 10, the boosting pump 30 may have a submerged form.

The boosting pump 30 may extract the liquefied gas stored in the liquefied gas storage tank 10 and pressurize the extracted liquefied gas to several to several tens of bar, and the boosting pump 30 may pressurize the liquefied gas to pressure required by the propulsion engine 21.

Particularly, the boosting pump 30 may pressurize the liquefied gas stored in the liquefied gas storage tank 10 to about 8 to 25 bars (preferably, 10 bars to 17 bars), which may correspond to appropriate pressure of the fuel which the low-speed two-stroke low pressure gas injection engine (for example, an XDF engine) that is the propulsion engine 21 is to receive. Herein, the boosting pump 30 may pressurize the liquefied gas up to about 8 bars to 25 bars at a time.

In addition, the boosting pump 30 may be operated in response to discharge pressure of the BOG compressor 50. The boosting pump 30 supplies the liquefied gas stored in the liquefied gas storage tank 10 to be joined to a downstream side of the BOG compressor 50, so that the boosting pump 30 may pressurize the liquefied gas in response to pressure discharged from the BOG compressor 50.

The liquefied gas stored in the liquefied gas storage tank 10 is in a liquid state, so that the boosting pump 30 may increase pressure and a temperature of the liquefied gas by pressurizing the liquefied gas discharged from the liquefied gas storage tank 10, and the liquefied gas pressurized by the boosting pump 30 may be still in the liquid state.

The forcing vaporizer 41 receives the pressurized liquefied gas from the boosting pump 30 and compulsorily vaporizes the liquefied gas. Particularly, the forcing vaporizer 41 may be provided on the second line L2, and may receive the pressurized liquefied gas from the boosting pump 30, compulsorily vaporize the received liquefied gas, and then supply the vaporized liquefied gas to the gas-liquid separator 42.

The forcing vaporizer 41 may vaporize the liquefied gas, and supply the vaporized liquefied gas to the gas-liquid separator 42 in a state of maintaining the pressure pressurized by the boosting pump 30.

The gas-liquid separator 42 may be provided on the second line L2, and may separate a phase of the liquefied gas received from the forcing vaporizer 41.

Particularly, the gas-liquid separator 42 may be provided between the forcing vaporizer 41 and the first heater 43 on the second line L2 to separate a phase of the liquefied gas received from the forcing vaporizer 41 and supply only the BOG in the gas phase to the propulsion engine 21.

The gas-liquid separator 42 may supply only the BOG in the gas phase to the first heater 43 through the second line L2 and return the BOG in the liquid phase, not the gas phase, to the liquefied gas storage tank 10.

Accordingly, in the embodiment of the present invention, it is possible to prevent waste of the BOG, thereby efficiently using the BOG.

The first heater 43 may be provided between the propulsion engine 21 and the gas-liquid separator 42 on the second line L2, and may heat the compulsorily vaporized liquefied gas supplied from the gas-liquid separator 42.

The first heater 43 may heat the compulsorily vaporized liquefied gas supplied from the gas-liquid separator 42 to a temperature required by the propulsion engine 21, and may heat the liquefied gas up to about 40 to 50° C. Herein, the first heater 43 may be a Low Duty (LID) heater.

The BOG compressor 50 is provided on the first line L1, and compresses the BOG generated in the liquefied gas storage tank 10 and supplies the compressed BOG to the propulsion engine 21. In this case, the BOG compressor 50 may compress the BOG to 8 bars to 20 bars (preferably, 10 bars to 17 bars).

The BOG supplied to the BOG compressor 50 may be supplied to the propulsion engine 21 while being changed from a state in which a temperature is about −150° C. and pressure is 1.03 bars to a state in which a temperature is about 45° C. and pressure is 8 bars to 20 bars (preferably, 10 bars to 17 bars).

The BOG compressor 50 may be formed with five stages to seven stages, and preferably, six stages. Particularly, the BOG compressor 50 may be centrifugally formed and formed with first to sixth stages, and a BOG cooling unit (not illustrated) may be additionally provided at a rear end of the compressor of each stage.

In the BOG compressor 50, when the number of provided stages of the compressor is less than five, a range of pressure of inflow gas is narrow, so that the stages of the compressor are inefficient for driving the propulsion engine 21, and when the number of provided stages of the compressor is more than seven, unnecessary compression is performed, so that oversizing is generated.

Accordingly, in the embodiment of the present invention, the number of states of the compressor configuring the BOG compressor 50 is limited to five to seven, thereby achieving an effect in that the optimal number of compression stages required for driving the propulsion engine 21.

Accordingly, there are effects in that it is possible to perform compression efficient to drive the propulsion engine 21, and it is possible to optimize the amount of power consumption of the BOG compressor 50.

Further, the BOG compressor 50 may be designed to have a capacity in which it is possible to process all of the naturally generated BOG generated in the liquefied gas storage tank 10 in a frill load state as a maximum processing capacity. Herein, the full load state refers to a state during a laden voyage in which the vessel voyages while the liquefied gas storage tank 10 provided in the vessel is fully filled with liquefied gas.

Accordingly, the BOG compressor 50 is designed to have a maximum processing capacity smaller than a maximum processing capacity of the existing BOG compressor, so that the BOG compressor 50 may use a compressor smaller than the compressor in the related art, thereby achieving effects in that system building cost is decreased and a space is maximally secured within a vessel.

A detailed description of the limitation of the maximum processing capacity of the BOG compressor 50 will be given in the description of each embodiment.

When the H/D compressor 51 loads the liquefied gas to the liquefied gas storage tank 10 or unloads the liquefied gas stored in the liquefied gas storage tank 10 to the outside, the H/D compressor 51 may be used for compressing the BOG in order to discharge the BOG generated in the liquefied gas storage tank 10 to the outside or incinerate the BOG, and the form of the compressor is not limited.

Hereinafter, the processing of loading the liquefied gas to the liquefied gas storage tank 10 or unloading the liquefied gas stored in the liquefied gas storage tank 10 to the outside by the H/D compressor 51 will be described.

The gas processing system 1 according to the embodiment of the present invention may include the H/D compressor 51 which pressurizes the BOG generated in the liquefied gas storage tank 10 during the loading or the unloading, a second heater 511 which heats the BOG compressed by the H/D compressor 51, and a land demand source (shore) (not illustrated) in which liquefied gas to be supplied to the liquefied gas storage tank 10 during bunkering is stored.

When the liquefied gas is first loaded to the liquefied gas storage tank 10 from the outside, that is, during the bunkering, in consideration of the fact that the liquefied gas is an ignitable material, a special operation, that is, a substitution operation, different from an operation of a general storage tank needs to be preceded.

In general, in a substitution method of the liquefied gas storage tank 10, dry gas is supplied into the liquefied gas storage tank 10 to remove moisture, and inert gas is supplied into the liquefied gas storage tank 10 to remove oxygen in order to remove a possibility of fire or explosion. Then, a gassing-up operation in which hydrocarbon gas prepared by vaporizing liquefied gas by using the LNG vaporizer 60 to be described below is supplied to the liquefied gas storage tank 10 to remove the insert gas is performed, and then a cool-down process of cooling the liquefied gas storage tank 10 by using the liquefied gas proceeds. When the gassing-up operation and the cool-down operation are completed, the substitution method is completed, and finally, the liquefied gas, such as LNG, is supplied into the liquefied gas storage tank 10 to perform a shipping operation.

On the contrast, when the liquefied gas stored in the liquefied gas storage tank 10 is unloaded to the land demand source (shore), a slightly different operation from that of the described process is performed.

First, the liquefied gas stored in the liquefied gas storage tank 10 is completely discharge to the land demand source (shore). In this case, residual liquefied gas exists, and in order to completely remove the residual liquefied gas, a warming-up operation is performed. In the warming-up operation, the residual liquefied gas is completely vaporized by compressing the BOG generated in the liquefied gas storage tank 10 by the H/D compressor 51, heating the compressed BOG by the second heater 511, and increasing an internal temperature of the liquefied gas storage tank 10. In order to completely remove the BOG remaining in the liquefied gas storage tank 10 after the warming-up operation, inert gas is supplied, and then air is supplied into the liquefied gas storage tank 10 by supplying oxygen. Through the process, the unloading process of the liquefied gas storage tank 10 is completed.

Herein, during the process of loading the liquefied gas (during the bunkering), even though the liquefied gas storage tank 10 is cooled down, the large amount of BOG is generated while liquefied gas is shipped, and in this case, there are concerns in increasing internal pressure of the liquefied gas storage tank 10, so that in order to discharge the generated BOG to the outside demand source (shore), the H/D compressor 51 is used.

Further, during the process of unloading the liquefied gas, in the warming-up operation, the H/D compressor 51 is used during the process of compressing the BOG in order to increase an internal temperature of the liquefied gas storage tank 10.

The H/D compressor 51 may implement both the compression process used during the process of loading the liquefied gas and the compression process used during the process of unloading the liquefied gas.

That is, the H/D compressor 51 may pressurize the BOG generated during the bunkering and supply the pressurized BOG to the land demand source (shore), or pressurize the BOG remaining in the liquefied gas storage tank 10 in the warming-up operation during the unloading of the liquefied gas, return the pressurized BOG to the liquefied gas storage tank 10 again, and enable the BOG to circulate the liquefied gas storage tank 10.

Particularly, the H/D compressor 51 may receive the BOG generated in the liquefied gas storage tank 10 through a fourth line L4, compress the received BOG, and supply the compressed BOG to the land demand source (shore) during the bunkering, and may compress the BOG remaining in the liquefied gas storage tank 10, heat the compressed BOG by the second heater 511, return the heated BOG to the liquefied gas storage tank 10, and then enable the BOG to circulate the liquefied gas storage tank 10, the H/D compressor 51, the second heater 511, and the liquefied gas storage tank 10 in order during the unloading of the liquefied gas. Accordingly, the liquefied gas stored in the liquefied gas storage tank 10 may be completely vaporized, and the vaporized liquefied gas may be completely discharged to the outside of the liquefied gas storage tank 10.

The LNG vaporizer 60 may be used in the case where the liquefied gas is first loaded to the liquefied gas storage tank 10 from the outside land demand source (shore), that is, in the gassing-up operation in the substitution operation preceded during the bunkering.

Particularly, the LNG vaporizer 60 may receive the liquefied gas from the land demand source (shore), and heat and vaporize the liquefied gas, and supply the vaporized liquefied gas to the liquefied gas storage tank 10 to substitute all inert gas with which the liquefied gas storage tank 10 is fully filled with the vaporized liquefied gas. Accordingly, the gassing-up operation is performed, and a cool-down operation to be subsequently performed is smoothly performed.

Hereinafter, various embodiments of the gas processing system 1 of the present invention which is derivable based on the configurations of the gas processing system 1 of the present invention will be described.

The gas processing system 1 according to the embodiment of the present invention may have a technology in which the BOG compressor 50 is designed to have a capacity in which it is possible to process all of the naturally generated BOG generated in the liquefied gas storage tank 10 in a full load state as a maximum processing capacity, so that the liquefied gas and/or the BOG is economically and effectively supplied from the liquefied gas storage tank 10 to the propulsion engine 21, thereby improving stability and reliability of the system.

The gas processing system 1 according to the embodiment of the present invention described with reference to FIG. 1 may include the BOG compressor 50 which compresses the BOG generated in the liquefied gas storage tank 10, the boosting pump 30 which pressurizes the liquefied gas stored in the liquefied gas storage tank 10, the forcing vaporizer 41 which receives the pressurized liquefied gas from the boosting pump 30 and compulsorily vaporizes the liquefied gas, the first line L1 which connects the liquefied gas storage tank 10 and the propulsion engine 21 and is provided with the BOG compressor 50, and the second line L2 which is connected with the liquefied gas storage tank 10 and the downstream side of the BOG compressor 50 on the first line L1 and is provided with the boosting pump 30 and the forcing vaporizer 41 as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Further, in the gas processing system 1 according to the embodiment of the present invention, the liquefied gas storage tank 10 and the downstream side of the BOG compressor 50 on the first line L1 are connected through the second line L2, and the boosting pump 30, the forcing vaporizer 41, and the first heater 43 are provided on the second line L2, and fuel supplied to the propulsion engine 21 may be supplemented through the first line L1.

Herein, the BOG compressor 50 may be designed to have a capacity in which it is possible to process all of the naturally generated BOG generated in the liquefied gas storage tank 10 in a full load state as a maximum processing capacity.

In the related art, the BOG compressor which processes BOG generated in the liquefied gas storage tank and supplies the processed BOG to the propulsion engine is designed to have a capacity in which it is possible to process all the amount of BOG required by the propulsion engine when a vessel has a speed as a maximum processing capacity.

As a result, the BOG compressor needs to receive and process even compulsorily generated BOG generated by compulsorily vaporizing the liquefied gas stored in the liquefied gas storage tank, as well as the BOG naturally generated in the liquefied gas storage tank in a full load state, so that it is necessary to set the maximum processing capacity to be very large.

Accordingly, the BOG compressor has a problem in that the maximum processing capacity is set to be very large, so that a large amount of building cost of the BOG compressor is required. In addition, the BOG compressor having the large maximum processing capacity is very large and requires a large building space, so that a usable space of a vessel is decreased, thereby being very disadvantageous in securing a space.

In order to solve the problems, the BOG compressor 50 in the embodiment of the present invention is designed to have a capacity in which it is possible to process all of the naturally generated BOG generated in the liquefied gas storage tank 10 in a full load state as a maximum processing capacity as described above. Herein, the full load state refers to a state during a laden voyage in which the vessel voyages while the liquefied gas storage tank 10 provided in the vessel is fully filled with liquefied gas.

Accordingly, the BOG compressor 50 may use the BOG compressor which is designed to have a maximum processing capacity smaller than a maximum processing capacity of the existing BOG compressor, thereby achieving the effects in that system building cost is decreased and a space is maximally secured within a vessel.

As described above, when the BOG compressor 50 is designed to have a capacity in which it is possible to process all of the naturally generated BOG generated in the liquefied gas storage tank 10 in a full load state as a maximum processing capacity, the BOG discharged from the BOG compressor 50 is insufficient for the vessel to output a maximum speed.

Because of this, in order to supplement the insufficient portion and enable the vessel to output a maximum speed, the present invention is implemented so that the compulsorily generated BOG compulsorily vaporized by the forcing vaporizer 41 is supplied to a rear end of the BOG compressor 50 to enable the propulsion engine 21 to sufficiently receive fuel for outputting a maximum speed.

Accordingly, in the embodiment of the present invention, the maximum capacity limitation of the BOG compressor 50 may be substantially implemented by solving the problem derived against the interest according to the maximum capacity limitation of the BOG compressor 50.

Further, in the vessel including the gas processing system 1 according to the embodiment of the present invention, energy used in the BOG compressor 50 is decreased, so that the amount of energy consumed during a ballast voyage is decreased, thereby achieving an effect in that more energy may be used for thrust of the vessel.

Further, in the embodiment of the present invention, a re-liquefying device 530 which re-liquefies the BOG compressed in the BOG compressor 50 may be provided (see FIG. 3). In this case, the re-liquefying device 530 is a re-liquefying device using a separate refrigerant.

In the embodiment of the present invention, required pressure of fuel of the propulsion engine 21 is 15 to 20 bars, so that the BOG compressor 50 cannot compress the BOG with 100 to 150 bars or 200 to 400 bars in which re-liquefying efficiency is high, and even though the BOG generated in the liquefied gas storage tank 10 is heat exchanged with at least a part of the BOG compressed by the BOG compressor 50, the BOG cannot be effectively re-liquefied.

Accordingly, in the embodiment of the present invention, the re-liquefying device 530 which includes a separate refrigerant for the efficient processing of the BOG may be provided.

Herein, the BOG re-liquefied by the liquefying device 530 may be supplied to a gas-liquid separator 531 and be separated into a gas phase and a liquid phase. The gas phase may be supplied to an upstream side of the BOG compressor 50 on the first line L1 again and be joined with the BOG generated in the liquefied gas storage tank 10, and the liquid phase may be returned to the liquefied gas storage tank 10 again.

Further, the re-liquefying device 530 may be provided on an seventeenth line L17 branched from the downstream side of the BOG compressor 50 on the first line L1 and connected to the upstream side of the BOG compressor 50 on the first line L1, and the gas-liquid separator 531 is also provided on the seventeenth line L17 to supply the gas phase to the upstream side of the BOG compressor 50 on the first line L1 through the seventeenth line L17. As the refrigerant used in the re-liquefying device 530, nitrogen (N2), a refrigerant mixture, or the like may be used.

The gas processing system 1 according to the embodiment of the present invention may include a technology of decreasing a load of the first heater 43 by providing the first heater 43 on the second line L2.

The gas processing system 1 according to the embodiment of the present invention described with reference to FIG. 1 may include the BOG compressor 50 which compresses the BOG generated in the liquefied gas storage tank 10, the boosting pump 30 which pressurizes the liquefied gas stored in the liquefied gas storage tank 10, the forcing vaporizer 41 which receives the pressurized liquefied gas from the boosting pump 30 and compulsorily vaporizes the liquefied gas, the first heater 43 which is provided on the second line L2, and increases a temperature of the liquefied gas that is compulsorily vaporized in the forcing vaporizer 41 before being joined with the BOG compressed in the BOG compressor 50, the first line L1 which connects the liquefied gas storage tank 10 and the propulsion engine 21 and is provided with the BOG compressor 50, and the second line L2 which is connected with the liquefied gas storage tank 10 and the downstream side of the BOG compressor 50 on the first line L1 and is provided with the boosting pump 30, the forcing vaporizer 41, and the first heater 43 as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Further, in the gas processing system 1 according to the embodiment of the present invention, the liquefied gas storage tank 10 and the downstream side of the BOG compressor 50 on the first line L1 are connected through the second line L2, the boosting pump 30, the forcing vaporizer 41, and the first heater 43 are provided on the second line L2, and fuel supplied to the propulsion engine 21 may be supplemented through the first line L1.

Herein, the BOG compressor 50 may be designed to have a capacity in which it is possible to process all of the naturally generated BOG generated in the liquefied gas storage tank 10 in a full load state as a maximum processing capacity.

In addition, in the embodiment of the present invention, the first heater 43 may be provided in the downstream side of the forcing vaporizer 41 on the second line L2.

When a temperature of the BOG compressed in the BOG compressor 50 is equal to or higher than a predetermined temperature, the first heater 43 may not increase a temperature of the liquefied gas compulsorily vaporized in the forcing vaporizer 41, and when the temperature of the BOG compressed in the BOG compressor 50 is lower than the predetermined temperature, the first heater 43 may increase the temperature of the liquefied gas compulsorily vaporized in the forcing vaporizer 41. In this case, the predetermined temperature is a temperature required by the propulsion engine 21, and may be, for example, 40° C. to 50° C., and preferably, about 45° C.

Herein, the first heater 43 may be controlled by a separate controller (not illustrated) and a control unit (not illustrated), and examples of the control unit may include a temperature sensor and electronic devices linked with the temperature sensor.

Further, the first heater 43 may be used only in a light load state. When the vessel is in the light load state, a small amount of BOG generated in the liquefied gas storage tank 10 is generated, so that it is possible to lower the temperature of the BOG discharged from the BOG compressor 50. In this case, it is possible to improve a final temperature of fuel supplied to the propulsion engine 21 by relatively increasing the temperature of the compulsorily vaporized liquefied gas supplied through the second line L2.

Herein, the light load state refers to a state during a ballast voyage in which the vessel voyages while the liquefied gas storage tank 10 provided in the vessel is filled with little liquefied gas.

The gas processing system 1 according to the embodiment of the present invention may include a technology of decreasing loads of the forcing vaporizer 41, the first heater 43, and the LNG vaporizer 60 and efficiently adjusting a temperature by effectively adjusting a flow amount of the liquefied gas and/or the BOG supplied to the forcing vaporizer 41, the first heater 43, and the LNG vaporizer 60.

A gas processing system 1 according to an embodiment of the present invention described with reference to FIG. 2 may include a forcing vaporizer 41 which receives pressurized liquefied gas from a boosting pump 30 and compulsorily vaporizes the liquefied gas, a first heater 43 which receives the compulsorily vaporized liquefied gas supplied from the forcing vaporizer 41 and heats the liquefied gas, an LNG vaporizer 60 which receives the liquefied gas from an outside storage place (shore) and vaporizes the liquefied gas, and returns the vaporized liquefied gas to a liquefied gas storage tank 10, a second line L2 which is connected to the liquefied gas storage tank 10 and a downstream side of a BOG compressor 50 on a first line L1 and is provided with the boosting pump 30, the forcing vaporizer 41, and the first heater 43, and a third line L3 which connects the outside storage place and the liquefied gas storage tank 10 and is provided with the LNG vaporizer 60 as main configurations.

Particularly, in the gas processing system 1 according to the embodiment of the present invention, the liquefied gas storage tank 10 and the propulsion engine 21 are connected through the second line L2, and the boosting pump 30, the forcing vaporizer 41, and the first heater 43 are provided on the second line L2. Further, in the embodiment of the present invention, the outside storage place and the liquefied gas storage tank 10 are connected through the third line L3, and the LNG vaporizer 60 may be provided.

In addition, in the embodiment of the present invention, a flow amount adjusting device which adjusts a flow amount of the liquefied gas and/or the BOG flowing into the forcing vaporizer 41 or the first heater 43 on the second line L2 and the LNG vaporizer 60 on the third line L3 may be further included.

The flow amount adjusting device may be identically or similarly provided in each of the forcing vaporizer 41, the first heater 43, and the LNG vaporizer 60, and the flow amount adjusting device provided in the forcing vaporizer 41 will be described below as an example. Further, the flow amount adjusting device is not limited to the forcing vaporizer 41, the first heater 43, or the LNG vaporizer 60.

The flow amount adjusting device may be connected while bypassing the forcing vaporizer 41, and may include a plurality of flow amount adjusting pipes CL1 to CL6 and flow amount adjusting valves 411 to 417 provided on the flow amount adjusting pipes CL1 to CL5 and the second line L2.

Particularly, the flow amount adjusting pipes CL1 to CL6 may include first to sixth flow amount adjusting pipes CL1 to CL6.

The first flow amount adjusting pipe CL1 may be connected while bypassing the forcing vaporizer 41 on the second line L2, and may be provided with a third adjusting valve 413. Accordingly, the first flow amount adjusting pipe CL1 may adjust a flow amount of the liquefied gas and/or the BOG flowing into the forcing vaporizer 41, and adjust a temperature of the liquefied gas and/or the BOG vaporized and discharged from the forcing vaporizer 41.

For example, in order to decrease a flow amount of the liquefied gas and/or the BOG flowing into the forcing vaporizer 41, a flow amount may be made to bypass to the first flow amount adjusting pipe CL1, and a temperature of the liquefied gas and/or the BOG may be lowered by making the liquefied gas and/or the BOG vaporized and discharged from the forcing vaporizer 41 bypass to the first flow amount adjusting pipe CL1. Herein, the third adjusting valve 413 adjusts the flow amount and/or the pressure of the liquefied gas and/or the BOG flowing on the first flow amount adjusting pipe CL1.

Further, a distal end of the first flow amount adjusting pipe CL1 connected to the downstream side of the forcing vaporizer 41 may be branched in parallel to be connected to the second line L2. Accordingly, there is an effect in that it is possible to additionally and precisely adjust the temperature of liquefied gas and/or the BOG vaporized and discharged from the forcing vaporizer 41.

The second flow amount adjusting line CL2 may be connected while bypassing the third adjusting valve 413 on the first flow amount adjusting line CL1, and may be provided with a fourth adjusting valve 414. Herein, the fourth adjusting valve 414 may be connected to the third adjusting valve 413 in parallel, and the fourth adjusting valve 414 and the third adjusting valve 413 may be configured so as to have the same capacity of processing liquefied gas and/or BOG and be alternately driven, and may back up each other.

Accordingly, a back-up system of the valve for adjusting the pressure and the flow amount of the forcing vaporizer 41 is prepared, so that there is an effect in that stability of the second flow amount adjusting line CL2 and the fourth adjusting valve 414 is improved.

Further, the fourth adjusting valve 414 is connected to the third adjusting valve 413 in parallel, and the fourth adjusting valve 414 is configured to have a flow amount adjustment unit that is smaller than or equal to a flow amount adjustment unit of the third adjusting valve 413, and the fourth adjusting valve 414 and the third adjusting valve 413 are combined and driven, thereby precisely controlling the flow amount.

Commonly, a range of the flow amount adjustment performed by the valve is about 10 to 15% of a flow amount processing capacity of the valve in top and bottom, so that as the flow amount processing capacity of the valve is small, it is possible to precisely adjust the flow amount. For example, when a flow amount processing capacity of the third adjusting valve 413 is 100 and a flow amount processing capacity of the fourth adjusting valve 414 is 50, the third adjusting valve 413 may perform flow amount processing of 5 or more and 95 or less, and the fourth adjusting valve 414 may perform flow amount processing of 2.5 or more and 47.5 or less. That is, the fine flow amount adjustment which the third adjusting valve 413 cannot process may be solved by the addition of the fourth adjusting valve 414.

Accordingly, there is an effect in that it is possible to more precisely adjust a flow amount compared to the case where the flow amount is adjusted only by the fourth adjusting valve 414.

The third flow amount adjusting line CL3 may be connected while bypassing the first adjusting valve 411 on the second line L2, and may be provided with a second adjusting valve 412. Further, the second adjusting valve 412 may be connected to the first adjusting valve 411 in parallel, and the second adjusting valve 412 and the first adjusting valve 411 may be configured so as to have the same capacity of processing liquefied gas and/or BOG and be alternately driven, thereby backing up each other, or the second adjusting valve 412 may be configured to have a flow amount adjustment unit that is smaller than or equal to a flow amount adjustment unit of the first adjusting valve 411 and the second adjusting valve 412 and the first adjusting valve 411 are combined and driven, thereby precisely controlling the flow amount.

The fourth flow amount adjusting line CL4 may be connected while bypassing the first flow amount adjusting line CL1 on the second line L2, and may be provided with a fifth adjusting valve 415 and a seventh adjusting valve 417. Herein, the seventh adjusting valve 417 may be a block valve. When a predetermined setting flow amount value is set, the seventh adjusting valve 417 may control only the setting flow amount value to pass.

The fifth flow amount adjusting line CL5 may be connected while bypassing the fifth adjusting valve 415 on the fourth flow amount adjusting line CL4, and may be provided with a sixth adjusting valve 416. Herein, the sixth adjusting valve 416 may be connected to the fifth adjusting valve 415 in parallel, and the sixth adjusting valve 416 and the fifth adjusting valve 415 may be configured so as to have the same capacity of processing liquefied gas and/or BOG and be alternately driven, thereby backing up each other, or the sixth adjusting valve 416 may be configured to have a flow amount adjustment unit that is smaller than or equal to a flow amount adjustment unit of the fifth adjusting valve 415 and the sixth adjusting valve 416 and the fifth adjusting valve 415 are combined and driven, thereby precisely controlling the flow amount.

The sixth flow amount adjusting line CL6 may be branched between the fifth adjusting valve 415 and the seventh adjusting valve 417 on the fourth flow amount adjusting line CL4 and be connected to the second line L2 The sixth flow amount adjusting line CL6 is provided without an adjusting valve, and the remaining flow amount may flow into the sixth flow amount adjusting line CL6 according to the setting flow amount value of the seventh adjusting valve 417 and be supplied to the second line L2. In this case, an end of the sixth flow amount adjusting line CL6 connected onto the second line L2 may be connected to a downstream side of a portion of the second line L2 connected with the fourth flow amount adjusting line CL4.

As described above, the gas processing system 1 according to the embodiment of the present invention includes the flow amount adjusting device which adjusts a flow amount of the liquefied gas and/or the BOG flowing into the forcing vaporizer 41 or the first heater 43 on the second line L2 and the LNG vaporizer 60 on the third line L3, thereby effectively adjusting a flow amount of the liquefied gas and/or the BOG, decreasing loads of the forcing vaporizer 41, the first heater 43, and the LNG vaporizer 60, and efficiently adjusting a temperature. Further, it is possible to back up the existing valve, thereby achieving an effect in that reliability of the adjustment of the flow amount is improved.

The gas processing system 1 according to the embodiment of the present invention may have a technology in which the fourth line L4 provided with the H/D compressor 51 is connected to other demand sources (not illustrated), such as the gas combustion unit 23, as well as the liquefied gas storage tank 10, thereby effectively processing BOG generated in the liquefied gas storage tank 10 even in an emergency situation.

The gas processing system 1 according to the embodiment of the present invention described with reference to FIG. 1 may include the BOG compressor 50 which compresses the BOG generated in the liquefied gas storage tank 10, the H/D compressor 51 which compresses the BOG generated in the liquefied gas storage tank 10 during loading or unloading, the second heater 511 which heats the BOG compressed by the H/D compressor 51, the first line L1 which connects the liquefied gas storage tank 10 and the propulsion engine 21 and is provided with the BOG compressor 50, the fourth line L4 which is connected so that the BOG generated in the liquefied gas storage tank 10 re-enters the liquefied gas storage tank 10 and is provided with the H/D compressor 51, and a fifth line L5 which is branched from a rear end of the second heater 511 on the fourth line IA and is connected with the gas combustion unit 23 as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Further, in the embodiment of the present invention, the fourth line L4 may be connected so that the BOG generated in the liquefied gas storage tank 10 re-enters the liquefied gas storage tank 10 through the fourth line L4, and the H/D compressor 51 may be provided on the fourth line L4.

In addition, in the embodiment of the present invention, the fifth line L5 which is branched from the rear end of the second heater 511 on the fourth line L4 and is connected with the gas combustion unit 23 may be further included.

In the related art, in a case where the propulsion engine 21 or the generation engine 22 cannot consume the BOG or the BOG compressor 50 cannot process the BOG (for example, an erroneous operation or a stop situation), it is impossible to process the BOG generated in the liquefied gas storage tank 10, so that there are concerns regarding the generation of a problem in safety of the liquefied gas storage tank 10.

In this respect, in the embodiment of the present invention, the H/D compressor 51 that is always provided is designed to back up or assist the BOG compressor 50, thereby solving the foregoing problem. Further, in order to implement the provided H/D compressor 51 so as to substantially back up or assist the BOG compressor 50, the fifth line L5 which is branched from the rear end of the second heater 511 on the fourth line L4 and is connected with the gas combustion unit 23 is newly added.

That is, in the embodiment of the present invention, in the case where the propulsion engine 21 or the generation engine 22 cannot consume the BOG or the BOG compressor 50 cannot process the BOG, the BOG generated in the liquefied gas storage tank 10 may be supplied to the gas combustion unit 23 by operating the H/D compressor 51, or in the case where the H/D compressor 51 backs up or assists the BOG compressor 50, the BOG generated in the liquefied gas storage tank 10 may be supplied to the propulsion engine 21, the generation engine 22, or the gas combustion unit 23 by operating the H/D compressor 51.

Accordingly, the gas processing system 1 according to the embodiment of the present invention has the effects in that it is possible to rapidly handle an emergency situation and improve safety and reliability of the system.

The gas processing system 1 according to the embodiment of the present invention may have a technology in which the BOG compressor 50 is designed to have a capacity in which it is possible to process all of the naturally generated BOG generated in the liquefied gas storage tank 10 in a full load state as a maximum processing capacity, and the liquefied gas and/or the BOG is economically and effectively supplied from the liquefied gas storage tank 10 to the propulsion engine 21 by driving the BOG compressor 50 and the system lines L1 and L2, thereby improving stability and reliability of the system.

The gas processing system 1 according to the embodiment of the present invention described with reference to FIG. 1 may include the BOG compressor 50 which compresses the BOG generated in the liquefied gas storage tank 10, the boosting pump 30 which pressurizes the liquefied gas stored in the liquefied gas storage tank 10, the forcing vaporizer 41 which receives the pressurized liquefied gas from the boosting pump 30 and compulsorily vaporizes the liquefied gas, the first line L1 which connects the liquefied gas storage tank 10 and the propulsion engine 21 and is provided with the BOG compressor 50, the second line L2 which is connected with the liquefied gas storage tank 10 and the downstream side of the BOG compressor 50 on the first line L1 and is provided with the boosting pump 30 and the forcing vaporizer 41, and a controller 71 which controls the liquefied gas and/or the BOG flowing on the first line L1 and the second line L2 as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Herein, the BOG compressor 50 may be designed to have a capacity in which it is possible to process all of the naturally generated BOG generated in the liquefied gas storage tank 10 in a full load state as a maximum processing capacity. Further, in the gas processing system 1 according to the embodiment of the present invention, the liquefied gas storage tank 10 and the downstream side of the BOG compressor 50 on the first line L1 are connected through the second line L2, the boosting pump 30, the forcing vaporizer 41, and the first heater 43 are provided on the second line L2, and fuel supplied to the propulsion engine 21 may be supplemented through the first line L1.

In addition, in the embodiment of the present invention, the controller 71 which controls the liquefied gas and/or the BOG flowing on the first line L1 and the second line L2 may be further included.

The controller 71 may compare a speed of the vessel with a predetermined speed and control the flow of the liquefied gas and/or the BOG flowing on the first line L1 and the second line L2. Herein, the predetermined speed refers to a speed at which the vessel is propelled in a case where the propulsion engine 21 completely consumes only the natural BOG generated in the liquefied gas storage tank 10 in the full load state, and may be, for example, 15 to 19 knots (preferably, 17 knots).

Particularly, when a speed of the vessel is within the predetermined speed, the controller 71 may control the BOG within the liquefied gas storage tank 10 to be supplied to the propulsion engine 21 only through the first line L1, and when the speed of the vessel is larger than the predetermined speed, the controller 71 may control the liquefied gas and/or the BOG within the liquefied gas storage tank 10 to be supplied to the propulsion engine 21 through the first line L1 and the second line L2.

Further, in addition to the control, the controller 71 may compare the amount of naturally generated BOG generated in the liquefied gas storage tank 10 with the amount of fuel required by the propulsion engine 21 and control the flow of the BOG and/or the liquefied gas on the first line L1 or the second line L2.

Particularly, when the amount of fuel required by the propulsion engine 21 is larger than the amount of naturally generated BOG, the controller 71 may control the liquefied gas and/or the BOG within the liquefied gas storage tank 10 to be supplied to the propulsion engine 21 through the first line L1 and the second line L2, and when the amount of fuel required by the propulsion engine 21 is smaller than the amount of naturally generated BOG, the controller 71 may control the BOG within the liquefied gas storage tank 10 to be supplied to the propulsion engine 21, the generation engine 22, or the gas combustion unit 23 only through the first line L1.

Herein, the controller 71 may include various control units (not illustrated) for implementing the foregoing control, and examples of the control unit may include a valve (not illustrated) and electronic devices (not illustrated) linked with the valve.

The driving of the BOG compressor 50 may be economically and optimally controlled through the control by the controller 71.

Further, in the embodiment of the present invention, the re-liquefying device 530 may be installed (see FIG. 3). The re-liquefying device 530 may liquefy the BOG by using a separate refrigerant (nitrogen or a refrigerant mixture), and may effectively re-liquefy the BOG compressed with low pressure.

Particularly, the re-liquefying device 530 may receive the BOG compressed to 15 to 20 bars by the BOG compressor 50 and re-liquefy the BOG, and the re-liquefied BOG is supplied to the gas-liquid separator 531. The re-liquefied BOG may be separated into a liquid phase and a gas phase in the gas-liquid separator 531, and the liquid phase may be returned to the liquefied gas storage tank 10 and the gas phase may be joined with the BOG discharged from the liquefied gas storage tank 10 again and supplied to the BOG compressor 50.

As described above, in the embodiment of the present invention which uses the low pressure liquefied gas or BOG as fuel of power for propelling the vessel, the re-liquefying device 530 having the separate refrigerant is provided, thereby achieving an effect in that it is possible to efficiently process the BOG.

The gas processing system 1 according to the embodiment of the present invention may have a technology in which the sixth line L6 which supplies the BOG generated in the liquefied gas storage tank 10 to the gas combustion unit 23 without a separate pressurizing means is provided, thereby decreasing system building cost and effectively managing internal pressure of the liquefied gas storage tank 10.

The gas processing system 1 according to the embodiment of the present invention described with reference to FIG. 1 may include the BOG compressor 50 which compresses the BOG generated in the liquefied gas storage tank 10, the gas combustion unit 23 which burns the BOG generated in the liquefied gas storage tank 10, the first line L1 which connects the liquefied gas storage tank 10 and the propulsion engine 21 and is provided with the BOG compressor 50, and the sixth line L6 which connects the liquefied gas storage tank 10 and the gas combustion unit 23 and does not include a separate pressurizing means as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1.

The sixth line L6 may connect the liquefied gas storage tank 10 and the gas combustion unit 23 without being provided with a separate pressurizing means, and supply the BOG generated in the liquefied gas storage tank 10 to the gas combustion unit 23 by internal pressure of the liquefied gas storage tank 10.

In the related art, a compressor needs to be always provided in the line which connects the gas combustion unit 23 and the liquefied gas storage tank 10 and supplies the BOG generated in the liquefied gas storage tank 10 to the gas combustion unit 23. When the gas combustion unit 23 has a predetermined pressure (for example, 3 to 5 bars), the gas combustion unit 23 may combust the BOG, and thus, there is a need for a pressurizing means for pressurizing the BOG generated in the liquefied gas storage tank 10. The installation of the pressurizing means causes a problem in that building cots is increased and a space within a vessel is insufficient.

In this respect, in the embodiment of the present invention, the BOG generated in the liquefied gas storage tank 10 is supplied to the gas combustion unit 23 by internal pressure of the liquefied gas storage tank 10 without a separate pressurizing means, thereby solving the foregoing problem, decreasing building cost, and securing a space within the vessel.

When the sixth line L6 has the same diameter as that of the existing line without a pressurizing means, the amount of BOG supplied to the gas combustion unit 23 is decreased, thereby causing a problem in that it is impossible to efficiently process the BOG within the liquefied gas storage tank 10.

Accordingly, in the embodiment of the present invention, the sixth line L6 does not include a separate pressurizing means, but may have a larger diameter than that of the existing line, and may have a diameter in which there is no delay in supplying the BOG generated in the liquefied gas storage tank 10 to the gas combustion unit 23. Herein, the first line L1 may be different from the existing line which supplies the BOG to the gas combustion unit 23 when the internal pressure of the liquefied gas storage tank 10 is increased, but the diameter thereof may be the same as or similar to that of the existing line. That is, in the embodiment of the present invention, the sixth line L6 may have a larger diameter than a diameter of the first line L1.

In the embodiment of the present invention, the gas combustion unit 23 may include a first burner unit (not illustrated) which consumes the BOG having first pressure and a second burner unit (not illustrated) which consumes the BOG having second pressure. Herein, a first-a line L1a branched from the first line L1 at the downstream side of the BOG compressor 50 may be connected with the first burner unit and the sixth line L6 may be connected with the second burner unit. In this case, the first pressure may be 3 to 5 bars, and the second pressure may be 1 to 2 bars.

Herein, the first burner unit may consume an excessive BOG portion when the amount of compressed BOG supplied to the propulsion engine 21 through the BOG compressor 50 is excessively large, and the second burner unit may consume an excessively generated BOG portion in order to prevent the liquefied gas storage tank 10 from being damaged when the amount of BOG generated in the liquefied gas storage tank 10 is sharply increased and thus the internal pressure of the liquefied gas storage tank 10 is increased.

As described above, in the embodiment of the present invention, the sixth line L6 which does not include a separate pressurizing means is provided, so that it is possible to effectively manage the internal pressure of the liquefied gas storage tank 10, minimize the building cost, and sufficiently secure a space within the vessel.

The gas processing system 1 according to the embodiment of the present invention may have a technology in which the second heater 511 which is used for the existing warming-up and the first heater 43 which increases a temperature of the liquefied gas compulsorily vaporized by the forcing vaporizer 41 are used together when the BOG is heated during the warming-up, and a temperature increase processing capacity of the second heater 511 used in the existing warming-up is decreased, thereby decreasing building cost of the heater and optimally using the heater.

A gas processing system 1 according to an embodiment of the present invention described with reference to FIG. 4 may include a forcing vaporizer 41 which receives pressurized liquefied gas from a boosting pump 30 and compulsorily vaporizes the liquefied gas, a first heater 43 which receives the compulsorily vaporized liquefied gas supplied from the forcing vaporizer 41 and heats the liquefied gas, an H/D compressor 51 which compresses the BOG generated in a liquefied gas storage tank 10 during loading or unloading, a second heater 511 which heats the BOG compressed by the H/D compressor 51, a second line L2 which connects the liquefied gas storage tank 10 and a propulsion engine 21 and is provided with the boosting pump 30, the forcing vaporizer 41, and the first heater 43, a fourth line IA which is connected so that the BOG generated in the liquefied gas storage tank 10 re-enters the liquefied gas storage tank 10 and is provided with the H/D compressor 51, a seventh-a line L7a which connects the second line L2 and the fourth line L4 at the upstream side of the first heater 43 and the second heater 511, and a seventh-b line L7b which connects the second line L2 and the fourth line L4 at the downstream side of the first heater 43 and the second heater 511 as main configurations.

Particularly, in the gas processing system 1 according to the embodiment of the present invention, the liquefied gas storage tank 10 and the propulsion engine 21 are connected through the second line L2, and the boosting pump 30, the forcing vaporizer 41, and the first heater 43 are provided on the second line L2. Further, in the gas processing system 1 according to the embodiment of the present invention, the fourth line L4 is connected so that the BOG generated in the liquefied gas storage tank 10 re-enters the liquefied gas storage tank 10 through the fourth line L4 and is provided with the HID compressor 51 and the second heater 511.

In addition, in the embodiment of the present invention, the seventh-a line L7a which connects the second line L2 and the fourth line L4 at the upstream side of the first heater 43 and the second heater 511, and the seventh-b line L7b which connects the second line L2 and the fourth line L4 at the downstream side of the first heater 43 and the second heater 511 may be further included.

That is, the second line L2 and the fourth line L4 may be connected with each other in at least one of the upstream side and the downstream side of the first heater 43 and the second heater 511 through the seventh-a line L7a and the seventh-b line L7b, and the first heater 43 and the second heater 511 may be provided in parallel to each other.

In this case, the first heater 43 and the second heater 511 may be designed to have capacities in which a sum of the temperature increase processing capacities is a capacity in which all the BOG generated during the loading or the unloading may be temperature increase processed, and the second heater 511 may assist the first heater 43.

Particularly, the first heater 43 may be designed to have a capacity in which all the liquefied gas compulsorily vaporized by the forcing vaporizer 41 may be temperature increase processed, and the second heater 511 may be designed to have a capacity obtained by subtracting the capacity of the first heater 43 from a capacity in which all the BOG generated during the loading or the unloading may be temperature increase processed.

For example, when it is assumed that a capacity in which all the BOG generated during the loading or the unloading of the liquefied gas may be temperature increase processed is 100 and a capacity in which all the liquefied gas compulsorily vaporized by the forcing vaporizer 41 may be temperature increase processed is 40, a temperature increase processing capacity of the first heater 43 may be set to 40 and a temperature increase processing capacity of the first heater 43 may be set to 60.

In the case of the related art, the amount of BOG generated during the loading or the unloading of the liquefied gas is very large, so that the heater for processing the BOG requires a considerable large capacity. Accordingly, there are disadvantages in that heater building cost is increased and a large space needs to be secured.

In order to solve the problem, in the gas processing system 1 according to the embodiment of the present invention, the first and second heaters 43 and 511 are designed as described above, and the seventh-a line L7a and the seventh-b line L7b are provided, so that when the fuel is supplied to the propulsion engine 21 through the existing forcing vaporizer 41, only the first heater 43 is controlled to be operated, and when the temperature of the BOG generated during the loading or the unloading of the liquefied gas is increased, both the first heater 43 and the second heater 511 are controlled to be operated, thereby achieving the effects in that it is possible to decrease heater building cost and optimally use the heater.

Herein, the first heater 43, the second heater 511, the seventh-a line L7a, and the seventh-b line L7b may be controlled by a separate controller (not illustrated) and a control unit (not illustrated), and examples of the control unit may include a control valve and electronic devices linked with the control valve.

The gas processing system 1 according to the embodiment of the present invention has the technology in which a six stage compressor is used as the BOG compressor 50, so that a separate heater may be omitted.

The gas processing system 1 according to the embodiment of the present invention described with reference to FIG. 1 may include the BOG compressor 50 which compresses the BOG generated in the liquefied gas storage tank 10, the forcing vaporizer 41 which receives the pressurized liquefied gas from the boosting pump 30 and compulsorily vaporizes the liquefied gas, the first line L1 which connects the liquefied gas storage tank 10 and the propulsion engine 21 and is provided with the BOG compressor 50, the second line L2 which connects the liquefied gas storage tank 10 and the downstream side of the BOG compressor 50 on the first line L1, and the second line L2 provided with the forcing vaporizer 41, the boosting pump 30 and the first heater 43 as main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Further, in the gas processing system 1 according to the embodiment of the present invention, the liquefied gas storage tank 10 and the downstream side of the BOG compressor 50 on the first line L1 are connected through the second line L2, the boosting pump 30, the forcing vaporizer 41, and the first heater 43 are provided on the second line L2, and fuel supplied to the propulsion engine 21 may be supplemented through the first line L1.

In addition, the BOG compressor 50 may compress the BOG to 15 to 20 bars so as to discharge the BOG at a temperature required by the propulsion engine 21.

In a case of the related art, when the compressor is provided with four stages, a temperature of the BOG discharged from the compressor is low, so that there is a problem in that a separate heater needs to be provided.

In this respect, in the embodiment of the present invention, the BOG compressor 50 is formed in a six stage centrifugal type or a two stage screw type, so that the BOG compressed to 15 to 20 bars by the BOG compressor 50 and discharged may have a temperature required by the propulsion engine 21. Accordingly, in the gas processing system 1 according to the embodiment of the present invention, a separate heater may not be provided on the first line L1.

In the embodiment of the present invention, a heater at a rear end of the BOG compressor 50 may be omitted, thereby decreasing system building cost and maximizing space availability of the vessel.

The gas processing system 1 according to the embodiment of the present invention may have a technology in which the boosting pump 30 pressurizes the liquefied gas to 15 to 20 bars and then supplies the pressurized liquefied gas to the gas-liquid separator 42, so that a methane number is adjusted by the gas-liquid separator 42 without a separate cooling device.

The adjustment of the methane number is an operation of removing heavy carbon (propane, butane, and the like) among the components within the vaporized liquefied gas, and refers to an operation of adjusting a methane number of the vaporized liquefied gas supplied to the generation engine 22 to be larger than a methane number required by the generation engine 22. This is for the purpose of preventing a knocking phenomenon from being generated in the generation engine 22.

Particularly, most of the components of naturally generated vaporized gas are methane, so that a methane number is larger than a methane number required by the generation engine 22 and thus a separate caution is not required, but compulsorily generated vaporized gas contains a heavy hydrocarbon (HHC) component, such as ethane, propane, and butane, in addition to the methane, so that a methane number may be smaller than a methane number required by the generation engine 22 and thus a caution is required.

To this end, in the related art, the compulsorily generated vaporized gas is used so that the compulsorily generated vaporized gas is maintained at a low temperature through separate cooling, and the heavy carbon components are left in a liquid phase and filtered in the gas-liquid separator. Commonly, a boiling point of heavy carbon at 5 bars corresponds to about −80° C. and a boiling point of heavy carbon at 17 bars corresponds to about −70° C.

The gas processing system 1 according to the embodiment of the present invention described with reference to FIG. 1 may include the boosting pump 30 which pressurizes the liquefied gas stored in the liquefied gas storage tank 10, the forcing vaporizer 41 which receives the pressurized liquefied gas from the boosting pump 30 and compulsorily vaporizes the liquefied gas, the gas-liquid separator 42 which receives the compulsorily vaporized liquefied gas from the forcing vaporizer 41 and adjusts a methane number, and the second line L2 which connects the liquefied gas storage tank 10 and the propulsion engine 21 and is provided with the boosting pump 30, the forcing vaporizer 41, and the gas-liquid separator 42 as main configurations.

Particularly, in the gas processing system 1 according to the embodiment of the present invention, the liquefied gas storage tank 10 and the propulsion engine 21 may be connected through the second line L2 and the boosting pump 30, the forcing vaporizer 41, and the gas-liquid separator 42 may be provided on the second line L2, and fuel of which a methane number is adjusted in the gas-liquid separator 42 of the second line L2 may be supplied to the propulsion engine 21.

In addition, in the embodiment of the present invention, the boosting pump 30 compresses the liquefied gas stored in the liquefied gas storage tank 10 to 15 to 20 bars and then supplies the compressed liquefied gas to the forcing vaporizer 41, the forcing vaporizer 41 compulsorily vaporizes the liquefied gas and then supplies the compulsorily vaporized liquefied gas to the gas-liquid separator 42, and the gas-liquid separator 42 gas-liquid separates the liquefied gas compulsorily vaporized by the forcing vaporizer 41 without a separate cooling device to perform an adjustment of a methane number.

In the case of the related art, the boosting pump pressurizes the liquefied gas stored in the liquefied gas storage tank to 5 to 7 bars and supplies the pressurized liquefied gas to the forcing vaporizer, and the forcing vaporizer compulsorily vaporizes the liquefied gas and supplies the compulsorily vaporized liquefied gas to the gas-liquid separator, so that the gas-liquid separator receives the compulsorily vaporized liquefied gas in a state of 5 to 7 bars.

Commonly, in a case where the naturally generated BOG is used as fuel of the propulsion engine without a change, a methane number of BOG is adjusted while the BOG is changed from liquefied gas to BOG, so that it is not necessary to adjust a methane number, but in order to supply the compulsorily generated BOG obtained by compulsorily vaporizing the liquefied gas as fuel of the propulsion engine, the BOG needs to be supplied after a methane number thereof is adjusted.

Particularly, in the adjustment of the methane number in the related art, the liquefied gas pressurized to 5 bars by the boosting pump is heated from −163° C. to about −65° C. to −75° C. in the forcing vaporizer, and then is cooled to −80° C. or lower again and is supplied to the gas-liquid separator. In this case, a temperature of the heavy carbon in the compulsorily vaporized liquefied gas at 5 bars and −80° C. is lowered to the boiling point or lower, so that the heavy carbon is left in a liquid phase, and other carbons are supplied to the propulsion engine in a gas phase state. That is, the adjustment of the methane number is a process of reducing the methane number.

As described above, in the case of the related art, the driving of the boosting pump is controlled to 5 bars to 7 bars, so that there is a problem in that the gas-liquid separator requires separate cooling for the adjustment of the methane number. Further, there is a case where the cooling operation is performed with the liquefied gas stored in the liquefied gas storage tank, so that there is a problem in that a disadvantage is generated in a dimension of preservation of cargo.

In order to solve the problem, in the embodiment of the present invention, as described above, when the compulsorily vaporized liquefied gas is supplied to the propulsion engine 21 as fuel, the boosting pump 30 is controlled to pressurize the liquefied gas to 15 to 20 bars, so that the adjustment of the methane number is performed by the gas-liquid separator 42 even without a separate cooling device.

When the liquefied gas is pressurized to 15 to 20 bars, even though the liquefied gas is heated from the −163° C. to −65° C. to −75° C., a temperature of the liquefied gas is not higher than the boiling point of the heavy carbon (the boiling point at 17 bars is increased up to −70° C.), so that the heavy carbon is left in a liquid phase. Accordingly, the gas-liquid separator 42 may adjust the methane number even without a separate cooling device.

As described above, in the embodiment of the present invention, when the compulsorily vaporized liquefied gas is supplied to the propulsion engine 21 as fuel, the boosting pump 30 is controlled to pressurize the liquefied gas to 15 to 20 bars, so that the gas-liquid separator 42 may adjust the methane number even without a separate cooling device, thereby decreasing system building cost and maximally protecting cargo.

Further, in the embodiment of the present invention, when the propulsion engine 21 is erroneously operated or an operation of the propulsion engine 21 is stopped, the boosting pump 30 may be controlled to pressurize the liquefied gas stored in the liquefied gas storage tank 10 to 5 to 10 bars and supply the pressurized liquefied gas to the generation engine 22 as generation fuel. In this case, the forcing vaporizer 41 may heat the liquefied gas pressurized to 5 to 10 bars only to −90° C. to −130° C., compulsorily vaporize the heated liquefied gas, and then supply the compulsorily vaporized liquefied gas to the gas-liquid separator 42. In this case, a temperature of the heavy carbon in the compulsorily vaporized liquefied gas is not higher than the boiling point (the boiling point at 5 bars is −80° C.), so that the heavy carbon may be left in a liquid phase and a methane number may be adjusted.

As described above, in the embodiment of the present invention, the boiling point of the adjustment of the methane number is adjusted according to an operation condition of the propulsion engine 21 by adjusting pressurization pressure of the boosting pump 30 according to the operation condition of the propulsion engine 21, so that the gas-liquid separator 42 may adjust the methane number even without a separate cooling device. Accordingly, it is possible to decrease system building cost and maximally protect cargo.

The gas processing system 1 according to the embodiment of the present invention may have a technology in which pressure discharged by the BOG compressor 50 according to the operation condition of the propulsion engine 21 is discharged in accordance with pressure required by the generation engine 22.

The gas processing system 1 according to the embodiment of the present invention described with reference to FIG. 1 may include the BOG compressor 50 which compresses the BOG generated in the liquefied gas storage tank 10, a controller 72 which determines whether the propulsion engine 21 operates and controls inflow fuel pressure of the generation engine 22, the first line L1 which connects the liquefied gas storage tank 10 and the propulsion engine 21 and is provided with the BOG compressor 50, and the seventh line L7 which is branched from the downstream side of the BOG compressor 50 on the first line L1 and is connected with the generation engine 22 as main configurations.

Particularly, in the gas processing system 1 according to the embodiment of the present invention, the liquefied gas storage tank 10 and the propulsion engine 21 may be connected through the first line L1, and the BOG compressor 50 may be provided on the first line L1 to supply the BOG compressed by the BOG compressor 50 to the propulsion engine 21. Further, the gas processing system 1 according to the embodiment of the present invention may enable pressure discharged by the BOG compressor 50 to be discharged in accordance with pressure required by the generation engine 22.

In addition, in the embodiment of the present invention, the controller 72 which determines whether the propulsion engine 21 operates and controls inflow fuel pressure of the generation engine 22, a flow amount control unit 501 which is disposed in the upstream side of the BOG compressor 50 and controls a flow amount of the BOG flowing into the BOG compressor 50, an eighth line L8 which is returned from the downstream side to the upstream side of the BOG compressor 50, and a valve 502 disposed in the downstream side of the BOG compressor 50 on the first line L1.

The controller 72 has three embodiments for determining whether the propulsion engine 21 operates and controlling inflow fuel pressure of the generation engine 22, which will be described below.

First, as a first embodiment, the controller 72 may determine whether the BOG compressed by the BOG compressor 50 is supplied to the propulsion engine 21 or the generation engine 22, and perform a variable frequency drive control on the BOG compressor 50 so that the BOG compressor 50 compresses the BOG to pressure required by the propulsion engine 21 and discharges the compressed BOG or compresses the BOG to pressure required by the generation engine 22 and discharges the compressed BOG. Herein, the pressure required by the propulsion engine 21 may be 15 to 20 bars, and the pressure required by the generation engine 22 may be 5 to 10 bars.

Particularly, when the propulsion engine 21 is erroneously operated or an operation of the propulsion engine 21 is stopped, the controller 72 may stop the driving of the propulsion engine 21 and operate the generation engine 22. To this end, the controller 72 may make the BOG compressor 50 compress the BOG to pressure required by the generation engine 22 and discharge the compressed BOG by performing the variable frequency drive control on the BOG compressor 50, and may supply the BOG discharged from the BOG compressor 50 to the generation engine 22, not the propulsion engine 21.

Further, the gas processing system 1 according to the embodiment of the present invention may further include the second line L2 provided with the boosting pump 30 and the forcing vaporizer 41.

In this case, the controller 72 may additionally perform the variable frequency drive control on the boosting pump 30, as well as the BOG compressor 50, to make the boosting pump 30 pressurize the liquefied gas to pressure required by the propulsion engine 21 when the liquefied gas is supplied to the propulsion engine 21 and make the boosting pump 30 pressurize the liquefied gas to pressure required by the generation engine 22 when the liquefied gas is supplied to the generation engine 22.

As described above, in the embodiment of the present invention, the BOG compressor 50 is variable frequency drive controlled through the controller 72, so that it is possible to supply the BOG to the generation engine 22 by adjusting the pressure of the BOG to the pressure required by the generation engine 22 according to the state of the propulsion engine 21, thereby achieving the effects in that building cost is decreased and fuel may be flexibly supplied.

As a second embodiment, the controller 72 may determine whether the BOG compressed by the BOG compressor 50 is supplied to the propulsion engine 21 or the generation engine 22, and control a flow of the liquefied gas and/or the BOG flowing in the first line L1 or the eighth line L8.

Particularly, when the propulsion engine 21 is erroneously operated or an operation of the propulsion engine 21 is stopped, the controller 72 may control at least a part of the BOG discharged from the BOG compressor 50 to flow the eighth line L8 to make the pressure of the BOG discharged from the BOG compressor 50 be the pressure required by the generation engine 22. Herein, the BOG flowing in the eighth line L8 may be supplied to the upstream side of the BOG compressor 50, and the valve 502 may be a three way valve.

In this case, the controller 72 controls the remaining portion of the BOG which is discharged from the BOG compressor 50 and has the pressure required by the generation engine 22 to flow the seventh line L7, thereby controlling the BOG compressed by the BOG compressor 50 to be supplied to the generation engine 22, not the propulsion engine 21.

As described above, in the embodiment of the present invention, at least a part of the BOG discharged from the BOG compressor 50 is controlled to be returned to the upstream side of the BOG compressor 50 through the controller 72, so that it is possible to adjust the pressure of the BOG to the pressure required by the generation engine 22 according to the state of the propulsion engine 21 and supply the BOG to the generation engine 22.

As a third embodiment, the controller 72 may determine whether the BOG compressed by the BOG compressor 50 is supplied to the propulsion engine 21 or the generation engine 22, and control the flow amount control unit 501 so that the BOG compressor 50 compresses the BOG to the pressure required by the propulsion engine 21 or the pressure required by the generation engine 22. Herein, the flow amount control unit 501 may be an Inlet Guide Vain (IGV), and may make the pressure of the BOG discharged from the BOG compressor 50 be passively adjusted by controlling a flow amount of the BOG flowing into the BOG compressor 50.

Particularly, when the propulsion engine 21 is erroneously operated or an operation of the propulsion engine 21 is stopped, the controller 72 operates the flow amount control unit 501 so that a flow amount of the BOG flowing into the BOG compressor 50 is decreased, and thus, the BOG compressor 50 may compress the BOG to the pressure required by the generation engine 22.

In this case, the controller 72 may implement the third embodiment by operating the flow amount control unit 501 and the valve 502 provided in the downstream side of the BOG compressor 50 together.

When the propulsion engine 21 is erroneously operated or an operation of the propulsion engine 21 is stopped, the controller 72 may allow the generation engine 22 to receive the compressed BOG discharged by the BOG compressor 50 which receives the decreased amount of BOG by increasing the degree of opening of the valve 502 and operating the flow amount control unit 501, and when the propulsion engine 21 is normally operated, the controller 72 may allow the propulsion engine 21 to receive the compressed BOG discharged by the BOG compressor 50 by decreasing the degree of opening of the valve 502 and stopping the flow amount control unit 501.

As described above, in the embodiment of the present invention, the flow amount control unit 501 is controlled through the controller 72, so that the pressure discharged from the BOG compressor 50 is passively changed by controlling the flow amount of the BOG flowing into the BOG compressor 50, and thus, it is possible to adjust the pressure of the BOG to the pressured required by the generation engine 22 according to the state of the propulsion engine 21 and supply the BOG to the generation engine 22.

The gas processing system 1 according to the embodiment of the present invention may have a technology in which the LNG vaporizer 60 operated during the gassing-up is configured to assist the forcing vaporizer 41, thereby improving safety of a fuel supply through the forcing vaporizer 41.

Figure 7:
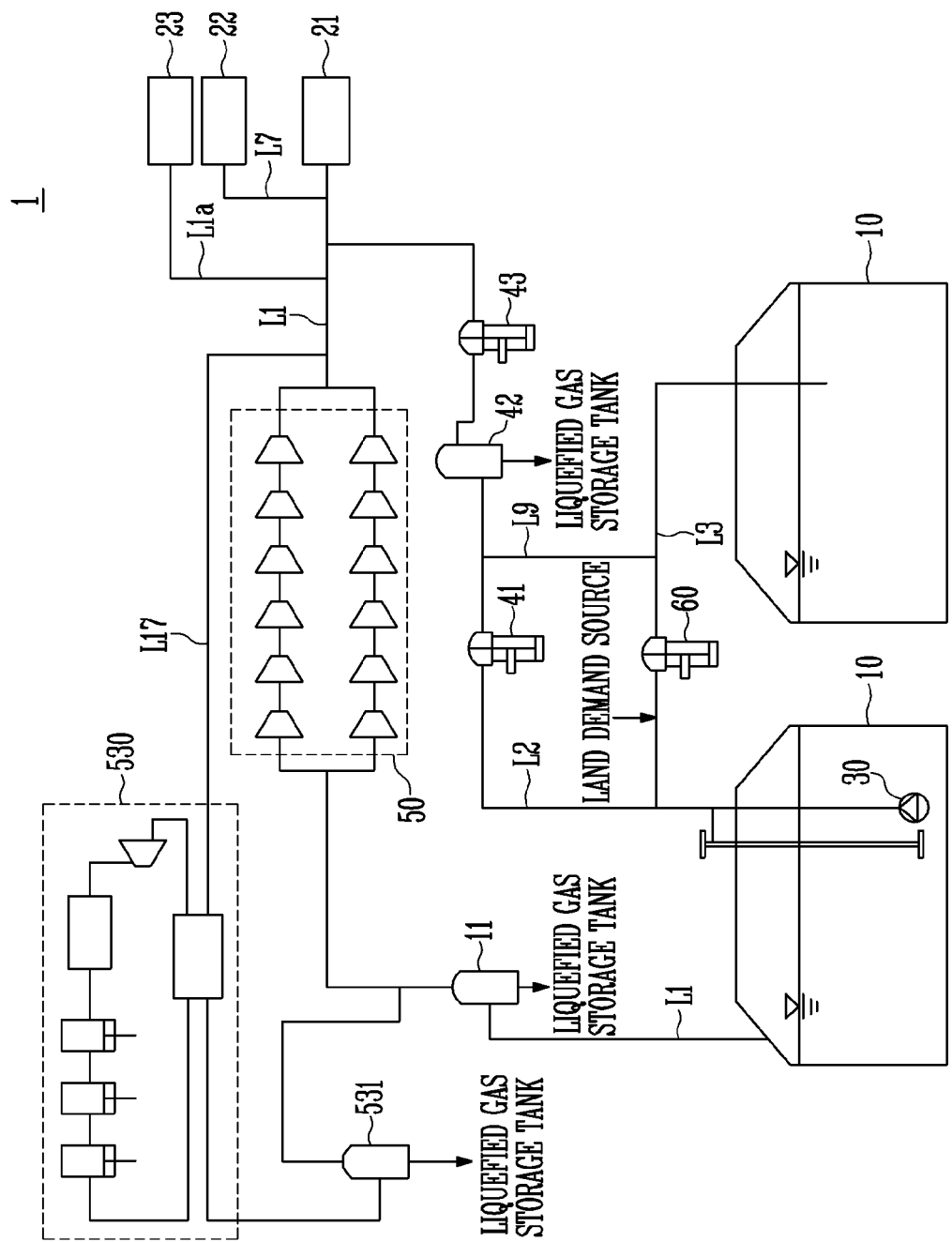
FIG. 7 is a concept diagram of a liquefied gas processing system according to a seventh embodiment of the present invention.

A gas processing system 1 according to an embodiment of the present invention described with reference to FIG. 7 may include a boosting pump 30 which pressurizes liquefied gas stored in a liquefied gas storage tank 10, a forcing vaporizer 41 which receives the pressurized liquefied gas from the boosting pump 30 and compulsorily vaporizes the liquefied gas, an LNG vaporizer 60 which receives the liquefied gas from an outside storage place (shore) or receives the liquefied gas from the liquefied gas storage tank 10 and vaporizes the liquefied gas, and returns the vaporized liquefied gas to the liquefied gas storage tank 10, a second line L2 which connects the liquefied gas storage tank 10 and a propulsion engine 21, and is provided with the boosting pump 30 and the forcing vaporizer 41, a third line L3 which connects the outside storage place and the liquefied gas storage tank 10 or connects the liquefied gas storage tank 10 and the liquefied gas storage tank 10, and is provided with the LNG vaporizer 60, and a ninth line L9 which connects the second line L2 and the third line L3 as main configurations.

Particularly, in the gas processing system 1 according to the embodiment of the present invention, the liquefied gas storage tank 10 and the propulsion engine 21 may be connected through the second line L2, the boosting pump 30 and the forcing vaporizer 41 may be provided on the second line L2, and the liquefied gas compulsorily vaporized by the forcing vaporizer 41 may be supplied to the propulsion engine 21. Further, the outside storage place and the liquefied gas storage tank 10 may be connected or the liquefied gas storage tank 10 and the liquefied gas storage tank 10 may be connected (in this case, the third line L3 may be formed to be branched from the second line L2 to be connected with the LNG vaporizer 60 and then connected with another liquefied gas storage tank 10 again) through the third line L3, and the third line L3 may be provided with the LNG vaporizer 60 to vaporize the liquefied gas during the gassing-up and supply the vaporized liquefied gas to the liquefied gas storage tank 10.

Herein, the liquefied gas storage tank 10 and the liquefied gas storage tank 10 are connected through the third line L3 because the liquefied gas storage tanks 10 need to be utilized when the plurality of liquefied gas storage tanks 10 is installed in the vessel (for example, a first liquefied gas storage tank 10 and a second liquefied gas storage tank 10 are provided) and it is necessary to supply liquefied gas to the empty first liquefied gas storage tank 10 from the second liquefied gas storage tank 10 in case of emergency or in other cases.

In addition, in the embodiment of the present invention, the ninth line L9 which connects the second line L2 and the third line L3 may be further included.

The ninth line L9 may be branched from the downstream side of the LNG vaporizer 60 of the third line L3 and be connected to the downstream side of the forcing vaporizer 41 of the second line L2. In this case, acceptable pressure of the LNG vaporizer 60 during the vaporizing of the liquefied gas may be the same as acceptable pressure of the forcing vaporizer 41, and may be about 15 to 20 bars.

That is, in the embodiment of the present invention, when the forcing vaporizer 41 is erroneously operated or an operation of the forcing vaporizer 41 is stopped, the compulsorily vaporized liquefied gas may be supplied to the propulsion engine 21 by using the LNG vaporizer 60.

Particularly, when the forcing vaporizer 41 is erroneously operated or an operation of the forcing vaporizer 41 is stopped, the boosting pump 30 may pressurize the liquefied gas stored in the liquefied gas storage tank 10 to 15 to 20 bars and transmit the pressurized liquefied gas to the LNG vaporizer 60 through the third line L3, and the liquefied gas compulsorily vaporized by the LNG vaporizer 60 may be supplied to the downstream side of the forcing vaporizer of the second line L2 through the ninth line L9 and then supplied to the propulsion engine 21 through the second line L2.

As described above, in the gas processing system 1 according to the embodiment of the present invention, the LNG vaporizer 60 operated during the gassing-up is configured to assist the forcing vaporizer 41, thereby improving safety of a fuel supply through the forcing vaporizer 41 and improving reliability.

The gas processing system 1 according to the embodiment of the present invention may have a technology in which when the liquefied gas leaks from a radiation part 101 of the liquefied gas storage tank 10, the BOG compressor 50 sucks the leaking liquefied gas.

A gas processing system 1 according to an embodiment of the present invention described with reference to FIG. 4 may include a liquefied gas storage tank 10 including the radiation part 101, a BOG compressor 50 which compresses the BOG generated in the liquefied gas storage tank 10, a boosting pump 30 which pressurizes the liquefied gas stored in the liquefied gas storage tank 10, a forcing vaporizer 41 which receives the pressurized liquefied gas from the boosting pump 30 and compulsorily vaporizes the liquefied gas, a controller 73 which controls the BOG compressor 50 so that the liquefied gas leaking from the radiation part 101 is sucked into the BOG compressor 50 when the liquefied gas leaks in the radiation part 101 of the liquefied gas storage tank 10, a detecting sensor 81 which detects whether the liquefied gas leaks in the radiation part 101, a gas-liquid separator 42 which receives the compulsorily vaporized liquefied gas from the forcing vaporizer 41 and performs a phase separation on the liquefied gas, a first line L1 which connects the liquefied gas storage tank 10 and a propulsion engine 21 and is provided with the BOG compressor 50, a second line L2 which connects the liquefied gas storage tank 10 and a downstream side of the BOG compressor 50 on the first line L1 and is provided with the boosting pump 30, the forcing vaporizer 41, and the gas-liquid separator 42, a tenth line L10 which connects the radiation part 101 of the liquefied gas storage tank 10 and the second line L2, an eleventh-a line L11a and an eleventh-b line L11b which connect the second line L2 and the first line L1 as main configurations. Herein, the radiation part 101 may be an InterBarrier Space (IBS) provided in the liquefied gas storage tank 10.

Particularly, in the gas processing system 1 according to the embodiment of the present invention, the liquefied gas storage tank 10 and the propulsion engine 21 may be connected through the first line L1, and the BOG compressor 50 may be provided on the first line L1 to supply the BOG compressed by the BOG compressor 50 to the propulsion engine 21. Further, the liquefied gas storage tank 10 and the downstream side of the BOG compressor 50 on the first line L1 may be connected through the second line L2 and the boosting pump 30, the forcing vaporizer 41, and a first heater 43 may be provided on the second line L2, thereby supplementing fuel supplied to the propulsion engine 21 through the first line L1.

In addition, in the embodiment of the present invention, the tenth line L10 which connects the radiation part 101 of the liquefied gas storage tank 10 and the second line L2, the controller 73 which determines whether the liquefied gas leaks in the radiation part 101 of the liquefied gas storage tank 10 and controls the leaking liquefied gas to be sucked through the BOG compressor 50, the detecting sensor 81 which detects whether the liquefied gas leaks in the radiation part 101, and the eleventh-a line L11a which is branched between the forcing vaporizer 41 and the gas-liquid separator 42 of the second line L2 and is connected with the upstream side of the BOG compressor 50 of the first line L1 may be further included.

When the liquefied gas leaks in the radiation part 101, the controller 73 may compulsorily vaporizes the liquefied gas leaking in the radiation part 101 through the forcing vaporizer 41, and then control the BOG compressor 50 to suck the compulsorily vaporized liquefied gas. In this case, the controller 73 may receive information about whether the liquefied gas leaks in the radiation part 101 from the detecting sensor 81 via a wire or wirelessly.

Particularly, the controller 73 may control so as to receive information indicating that the liquefied gas leaks in the radiation part 101 from the detecting sensor 81 via a wire or wirelessly, supply the liquefied gas leaking in the radiation part 101 to the forcing vaporizer 41 through the tenth line L10, compulsorily vaporize the liquefied gas leaking in the radiation part 101 through the forcing vaporizer 41, and then suck the compulsorily vaporized liquefied gas by the BOG compressor 50 through the eleventh-a line L11a. In this case, the controller 73 makes sound pressure to be applied to the radiation part 101 by operating the BOG compressor 50, thereby controlling the BOG compressor 50 to suck the liquefied gas leaking in the radiation part 101.

Further, in the embodiment of the present invention, instead of the eleventh-a line L11a, the eleventh-b line L11b which is branched from the downstream side of the gas-liquid separator 42 of the second line L2 and is connected to the upstream side of the BOG compressor 50 of the first line L1 may be further included. As a matter of course, the preset invention is not limited thereto, and both the eleventh-a line L11a and the eleventh-b line L11b may be provided, but hereinafter, for a specific description, the case where only the eleventh-b line L11b is provided will be described.

When the liquefied gas leaks in the radiation part 101, the controller 73 may control the liquefied gas leaking in the radiation part 101 to be compulsorily vaporized by the forcing vaporizer 41 and then only a gas phase separated from the gas-liquid separator 42 to be sucked by the BOG compressor 50. Accordingly, the problem in that driving efficiency of the BOG compressor 50 deteriorates because there is a concern that a liquid phase is included even in the liquefied gas compulsorily vaporized by the forcing vaporizer 41 is solved through the gas-liquid separator 42.

Particularly, the controller 73 may make a control so as to receive information indicating that the liquefied gas leaks in the radiation part 101 from the detecting sensor 81 via a wire or wirelessly, supply the liquefied gas leaking in the radiation part 101 to the forcing vaporizer 41 through the tenth line L10, compulsorily vaporize the liquefied gas leaking in the radiation part 101 by the forcing vaporizer 41, supply the compulsorily vaporized liquefied gas to the gas-liquid separator 42, and separate the liquefied gas into a gas phase and a liquid phase by the gas-liquid separator 42.

Then, the controller 73 may make a control so that the BOG compressor 50 sucks the gas phase separated in the gas-liquid separator 42 through the eleventh-b line L11b, and the liquid phase separated in the gas-liquid separator 42 returns to the liquefied gas storage tank 10. In this case, the controller 73 makes sound pressure to be applied to the radiation part 101 by operating the BOG compressor 50, thereby controlling the BOG compressor 50 to suck the liquefied gas leaking in the radiation part 101.

As described above, in the embodiment of the present invention, when the liquefied gas leaks in the radiation part 101 of the liquefied gas storage tank 10, the BOG compressor 50 is controlled to suck the leaking liquefied gas, thereby achieving effects in that safety of the liquefied gas storage tank 10 is improved and system building cost is decreased.

The gas processing system 1 according to the embodiment of the present invention may have a technology of effectively re-liquefying the BOG generated in the liquefied gas storage tank 10 and efficiently using the BOG by using a BOG heat exchanger 521 and an additional BOG compressor 52.

The gas processing system 1 according to an embodiment of the present invention described with reference to FIG. 2 may include a BOG compressor 50 which compresses BOG generated in a liquefied gas storage tank 10, the additional BOG compressor 52 which additionally compresses the BOG compressed by the BOG compressor 50, the BOG heat exchanger 521 which heat-exchanges at least one of the BOG generated in the liquefied gas storage tank 10, the BOG additionally compressed by the additional BOG compressor 52, and the BOG in a gas phase separated by a gas-liquid separator 522, the gas-liquid separator 522 which separates the BOG heat-exchanged by the BOG heat exchanger 521 into a gas phase and a liquid phase, an expansion valve 523 which decompresses or expands the oration gas heat-exchanged by the BOG heat exchanger 522, a first line L1 which connects the liquefied gas storage tank 10 and a propulsion engine 21 and is provided with the BOG compressor 50, a twelfth line L12 which is branched from a downstream side of the BOG compressor 50 on the first line L1 to be connected with the gas-liquid separator 522, and is provided with the additional BOG compressor 52, the BOG heat exchanger 521, and an expansion valve 523, and a thirteenth line L13 which connects the gas-liquid separator 522 and the BOG heat exchanger 521 as main configurations.

Particularly, in the gas processing system 1 according to the embodiment of the present invention, the liquefied gas storage tank 10 and the propulsion engine 21 may be connected through the first line L1, and the BOG compressor 50 may be provided on the first line L1 to supply the BOG compressed by the BOG compressor 50 to the propulsion engine 21. Herein, the BOG compressor 50 may be designed to have a capacity in which it is possible to process all of the naturally generated BOG generated in the liquefied gas storage tank 10 in a full load state as a maximum processing capacity.

In addition, in the embodiment of the present invention, the gas-liquid separator 522 is connected in the downstream side of the BOG compressor 50 on the first line L1 through the twelfth line L12 and the additional BOG compressor 52, the BOG heat exchanger 521, and the expansion valve 523 are provided on the twelfth line L12, so that at least some of the BOG compressed by the BOG compressor 50 may be compressed by the additional BOG compressor 52, and then may be supplied to the BOG heat exchanger 521 and re-liquefied.

In the embodiment of the present invention, the propulsion engine 21 is a low-speed two-stroke low pressure gas injection engine and requires 15 to 20 bars. Accordingly, the BOG compressor 50 also performs the compression only up to 15 to 20 bars.

Accordingly, when the BOG heat exchanger 521 heat exchanges the BOG which fails to be supplied to the propulsion engine 21 among the BOG compressed by the BOG compressor 50 with the BOG generated in the liquefied gas storage tank 10 without an additional compression, the pressure of the compressed BOG is just 15 to 20 bars, so that there is a problem in that the BOG is not re-liquefied.

In this respect, in the embodiment of the present invention, the additional BOG compressor 52 is provided in the upstream side of the BOG heat exchanger 521, so that the BOG heat exchanger 521 receives and re-liquefies the additionally compressed BOG, thereby achieving an effect in that the BOG is re-liquefied.

The additional BOG compressor 52 may be formed with, for example, two stages or three stages, and may additionally compress the BOG compressed to 15 to 20 bars by the BOG compressor 50 up to 100 to 150 bars or 200 to 400 bars.

Herein, the BOG heat exchanger 521 may receive the BOG generated in the liquefied gas storage tank 10 through the first line L1, receive the BOG additionally compressed by the additional BOG compressor 52 through the twelfth line L12, and receive the gas phase separated in the gas-liquid separator 522 through the thirteenth line L13. Accordingly, the BOG heat exchanger 521 may heat exchange at least two or more of the BOG supplied from in the liquefied gas storage tank 10, the BOG additionally compressed by the additional BOG compressor 52, and the gas phase separated in the gas-liquid separator 522 with each other.

Preferably, the BOG heat exchanger 521 may firstly heat exchanges the BOG additionally compressed by the additional BOG compressor 52 with the BOG supplied from in the liquefied gas storage tank 10, and then may secondarily heat exchange the heat exchanged BOG with the gas phase separated in the gas-liquid separator 522. Accordingly, there is an effect in that a re-liquefying rate of the additionally BOG is maximally improved.

In this case, the BOG which is heat exchanged in the BOG heat exchanger 521 and is re-liquefied may be supplied to the gas-liquid separator 522 in a state of being decompressed to 1 to 7 bars by the expansion valve 523, and may be separated into a gas phase and a liquid phase in the gas-liquid separator 522. Herein, the gas phase may be supplied to the BOG heat exchanger 521 again and additionally supply cold and heat to the additionally compressed BOG, thereby improving a re-liquefying rate, and the liquid phase may be returned to the liquefied gas storage tank 10.

The gas processing system 1 according to the embodiment of the present invention may additionally have six embodiments through a change in disposition of the foregoing main configurations in order to effectively re-liquefy BOG and more efficiently use BOG, and the six embodiments will be described below.

First, as a first embodiment, a gas processing system 1 according to the embodiment of the present invention may supply a gas phase separated in a gas-liquid separator 522 to a downstream side of a BOG heat exchanger 521 on a first line L1 via the BOG heat exchanger 521.

To this end, the gas processing system 1 according to the embodiment of the present invention may include a fourteenth line L14 which connects the gas-liquid separator 522 and a space between the BOG heat exchanger 521 and a BOG compressor 50 on the first line L1, and via the BOG heat exchanger 521.

Accordingly, the gas phase separated in the gas-liquid separator 522 is mixed with the BOG supplied from a liquefied gas storage tank 10 to the BOG compressor 50, thereby minimizing an increase in internal pressure of the liquefied gas storage tank 10 by the BOG or the discharge of the BOG to the outside.

As a second embodiment, a gas processing system 1 according to the embodiment of the present invention may further include a boosting pump 30 which pressurizes liquefied gas stored in a liquefied gas storage tank 10, a forcing vaporizer 41 which receives the pressurized liquefied gas from the boosting pump 30 and compulsorily vaporizes the liquefied gas, and a second line L2 which connects the liquefied gas storage tank 10 and a downstream side of a BOG compressor 50 on a first line L1 and is provided with the boosting pump 30, the forcing vaporizer 41, and the gas-liquid separator 42, in addition to the configurations of the first embodiment.

As described above, in the second embodiment, in addition to the first embodiment, the second line L2 provided with the boosting pump 30, the forcing vaporizer 41, and the gas-liquid separator 42 is connected to the downstream side of the BOG compressor 50, thereby achieving an effect in that a load of the BOG compressor 50 is decreased.

As a third embodiment, a gas processing system 1 according to the embodiment of the present invention may further include a boosting pump 30 which pressurizes liquefied gas stored in a liquefied gas storage tank 10, a forcing vaporizer 41 which receives the pressurized liquefied gas from the boosting pump 30 and compulsorily vaporizes the liquefied gas, and a sixteenth line L16 which connects the liquefied gas storage tank 10 and an upstream side of a BOG compressor 50 on a first line L1 and is provided with the boosting pump 30, the forcing vaporizer 41, and the gas-liquid separator 42, in addition to the configurations of the first embodiment. In the third embodiment, the BOG compressor 50 may be designed to have a capacity in which it is possible to process all of the amount of BOG required by a propulsion engine 21 when a vessel has a maximum speed as a maximum processing capacity, unlike the foregoing BOG compressor 50.

As described above, in the third embodiment, in addition to the first embodiment, the sixteenth line L16 provided with the boosting pump 30, the forcing vaporizer 41, and the gas-liquid separator 42 is connected to the upstream side of the BOG compressor 50, so that it is possible to additionally supply the BOG to the forcing vaporizer 41 according to a change in a load of a low-speed two-stroke low pressure gas injection engine that is the propulsion engine 21, thereby flexibly responding to the propulsion engine 21, and it is possible to efficiently control required pressure of the propulsion engine 21.

As a fourth embodiment, a gas processing system 1 according to the embodiment of the present invention may supply a gas phase separated in a gas-liquid separator 522 to an upstream side of an additional BOG compressor 52 on a twelfth line L12 via a BOG heat exchanger 521.

To this end, the gas processing system 1 according to the embodiment of the present invention may include a fifteenth line L15 which connects the gas-liquid separator 522 and the upstream side of the additional BOG compressor 52 on the twelfth line L12, and via the BOG heat exchanger 521.

Accordingly, the gas phase separated in the gas-liquid separator 522 is mixed with the compressed BOG supplied to the upstream side of the additional BOG compressor 52, thereby decreasing a load of the BOG compressor 50 and minimizing a size of the BOG compressor 50.

As a fifth embodiment, a gas processing system 1 according to the embodiment of the present invention may further include a boosting pump 30 which pressurizes liquefied gas stored in a liquefied gas storage tank 10, a forcing vaporizer 41 which receives the pressurized liquefied gas from the boosting pump 30 and compulsorily vaporizes the liquefied gas, and a second line L2 which connects the liquefied gas storage tank 10 and a downstream side of a BOG compressor 50 on a first line L1 and is provided with the boosting pump 30, the forcing vaporizer 41, and the gas-liquid separator 42, in addition to the configurations of the fourth embodiment.

As described above, in the fifth embodiment, in addition to the fourth embodiment, the second line L2 provided with the boosting pump 30, the forcing vaporizer 41, and the gas-liquid separator 42 is connected to the downstream side of the BOG compressor 50, thereby achieving an effect in that a load of the BOG compressor 50 is decreased.

As a sixth embodiment, a gas processing system 1 according to the embodiment of the present invention may further include a boosting pump 30 which pressurizes liquefied gas stored in a liquefied gas storage tank 10, a forcing vaporizer 41 which receives the pressurized liquefied gas from the boosting pump 30 and compulsorily vaporizes the liquefied gas, and a sixteenth line L16 which connects the liquefied gas storage tank 10 and an upstream side of a BOG compressor 50 on a first line L1 and is provided with the boosting pump 30, the forcing vaporizer 41, and the gas-liquid separator 42, in addition to the configurations of the fourth embodiment. In the sixth embodiment, the BOG compressor 50 may be designed to have a capacity in which it is possible to process all of the amount of BOG required by a propulsion engine 21 when a vessel has a maximum speed as a maximum processing capacity, unlike the foregoing BOG compressor 50.

As described above, in the sixth embodiment, in addition to the fourth embodiment, the sixteenth line L16 provided with the boosting pump 30, the forcing vaporizer 41, and the gas-liquid separator 42 is connected to the upstream side of the BOG compressor 50, so that it is possible to additionally supply the BOG to the forcing vaporizer 41 according to a change in a load of a low-speed two-stroke low pressure gas injection engine that is the propulsion engine 21, thereby flexibly responding to the propulsion engine 21, and it is possible to efficiently control required pressure of the propulsion engine 21.

The gas processing system 1 according to the embodiment of the present invention may have a technology in which a plurality of BOG compressors which compresses BOG to be supplied to the propulsion engine 21 and is driven by a separate driving source is prepared to minimize a configuration for backing up the BOG compressor.

A gas processing system 1 according to an embodiment of the present invention described with reference to FIG. 6 may include a first BOG compressor 54 and a second BOG compressor 55 which compress BOG generated in a liquefied gas storage tank 10, a buffer tank provided between the first BOG compressor 54 and the second BOG compressor 55, a first line L1 which connects the liquefied gas storage tank 10 and a propulsion engine 21 and is provided with the first and second BOG compressors 54 and 55 and the buffer tank 90, and an eighteenth line L18 which is branched between the first BOG compressor 54 and the second BOG compressor 55 on the first line L1 to be connected with a generation engine 22, and is provided with the buffer tank 90 as main configurations.

In the gas processing system 1 according to the embodiment of the present invention, the liquefied gas storage tank 10 and the propulsion engine 21 may be connected through the first line L1, and the first and second BOG compressors 54 and 55 may be provided on the first line to supply the BOG compressed by the first and second BOG compressors 54 and 55 to the propulsion engine 21.

In this case, the first and second BOG compressors 54 and 55 are driven by separate different driving sources, respectively, so as to back up each other. That is, the first BOG compressor 54 and the second BOG compressor 55 have the different driving sources, respectively This will be described below in detail.

The first BOG compressor 54 is a centrifugal compressor, and may compress the BOG to about 5 to 10 bars, and may be disposed in an upstream side of the buffer tank 90 provided on the first line L1. In this case, the first BOG compressor 54 is a compressor for an extremely low temperature. Further, the buffer tank 90 may be a separate storage medium, but a separate space may be prepared on the first line L1, such as a case where a diameter of a predetermined portion of the first line L1 is expanded.

The first BOG compressor 54 may be formed of a first-a BOG compressor 541 and a first-b BOG compressor 542 which are formed in parallel. In this case, the first-a BOG compressor 541 and the first-b BOG compressor 542 may be driven by separate different driving sources and may back up each other.

For example, the first-a BOG compressor 541 may be a main compressor and the first-b BOG compressor 542 may be an auxiliary compressor, and when the first-a BOG compressor 541 is erroneously operated or is in an operation impossible state, the first-b BOG compressor 542 may operate to back up the first-a BOG compressor 541, and when the first-a BOG compressor 541 cannot compress all of the designated amount of BOG, the first-a BOG compressor 541 and the first-b BOG compressor 542 may operate to assist the first-b BOG compressor 542 and the first-a BOG compressor 541.

The second BOG compressor 55 is a reciprocating compressor, and may additionally compress the BOG compressed by the first BOG compressor 54 to about 15 to 20 bars, and may be disposed in the downstream side of the buffer tank 90 provided on the first line L1. In this case, unlike the first BOG compressor 54, an assisting compressor is not separately formed in the second BOG compressor 55. In this case, the second BOG compressor 55 may be a compressor for a normal temperature.

A controller 74 may control the driving of the first-1, first-b, and second BOG compressors 541, 542, and 55 by recognizing driving states of the first-1, first-b, and second BOG compressors 541, 542, and 55 and control a flow of the liquefied gas and/or the BOG flowing on the eighteenth line L18. In this case, the flow of the liquefied gas and/or the BOG flowing on the eighteenth line L18 may be controlled by a separately provided valve (not illustrated).

Particularly, the controller 74 may operate the first-b BOG compressor 542 when it is necessary to assist or back up the first-a BOG compressor 541, and for example, when it is necessary to assist or back up the second BOG compressor 55, the controller 74 may control only the first-a BOG compressor 541 to operate to supply the BOG to a generation engine 22 through the eighteenth line L18.

The controller 74 may temporarily store the BOG compressed by the first BOG compressor 54 in the buffer tank 90 when it is necessary to assist or back up the second BOG compressor 55, and then supply the stored BOG to the eighteenth line L18 to supply the BOG to the generation engine 22.

Further, in the embodiment of the present invention, there are further included first and second additional BOG compressors 56 and 57 which additionally compress the BOG compressed by the first and/or second BOG compressors 54 and 55, a BOG heat exchanger 521 which heat exchanges at least one of the BOG generated in the liquefied gas storage tank 10, the BOG additionally compressed by the first and second additional BOG compressors 56 and 57, and the BOG in a gas phase separated by a gas-liquid separator 522, the gas-liquid separator 522 which separates the BOG heat-exchanged by the BOG heat exchanger 521 into a gas phase and a liquid phase, an expansion valve 523 which decompresses or expands the BOG heat-exchanged by the BOG heat exchanger 521, the first and second additional BOG compressors 56 and 57 which are branched from a downstream side of the second BOG compressor 55 on the first line L1 and are connected with the gas-liquid separator 522, a nineteenth line L19 which is provided with the BOG heat exchanger 521 and the expansion valve 523, and a twentieth line L20 which bypasses the second additional BOG compressor 57.

Herein, the BOG compressor 521 may also heat exchange only the BOG generated in the liquefied gas storage tank 10 and the BOG additionally compressed by the first and second additional BOG compressors 56 and 57, but the present invention is not limited thereto.

In this case, the controller 74 may control the driving of the first and second additional BOG compressors 56 and 57 by recognizing the driving states of the first and second BOG compressors 54 and 55, and control the flow of the liquefied gas and/or the BOG flowing on the twentieth line L20, thereby reliably re-liquefying the BOG through the BOG heat exchanger 521. In this case, the flow of the liquefied gas and/or the BOG flowing on the twentieth line L20 may be controlled by a separately provided valve (not illustrated).

Particularly, when the first or second BOG compressors 54 or 55 is normally operated, the controller 74 may not operate the second additional BOG compressor 57 and control the BOG to bypass the second additional BOG compressor 57 through the twentieth line L20 and be directly supplied to the first additional BOG compressor 56, and when it is necessary to assist or back up the first or second BOG compressor 54 or 55, the controller 74 may operate the second additional BOG compressor 57.

In this case, the second additional BOG compressor 57 is designed to have the same capacity as a capacity in which the first or second BOG compressor 54 or 55 may compress the BOG, so that when the first or second BOG compressor 54 or 55 is erroneously operated or an operation of the first or second BOG compressor 54 or 55 is stopped, the second additional BOG compressor 57 compresses the BOG by the amount which the first or second BOG compressors 54 or 55 compresses the BOG and supplies the compressed BOG to the first additional BOG compressor 56, so that even when the first or second BOG compressor 54 or 55 is erroneously operated or the operation of the first or second BOG compressor 54 or 55 is stopped, the BOG may be continuously re-liquefied in the BOG heat exchanger 521.

For example, when the second additional BOG compressor 57 is designed to have the same capacity as a capacity in which the second BOG compressor 55 may compress the BOG, the controller 74 may control the BOG compressed by the second BOG compressor 55 to bypass the second additional BOG compressor 57 through the twentieth line L20 and to be supplied to the first additional BOG compressor 56 when the second BOG compressor 55 is normally operated, and when the second BOG compressor 55 is erroneously operated or an operation of the second BOG compressor 55 is stopped, the controller 74 may compress the BOG by the amount by which the second BOG compressor 55 compresses the BOG, and supply the compressed BOG to the first additional BOG compressor 56.

Further, in the embodiment of the present invention, there are further included a first pressure sensor 82 which measures pressure of the BOG flowing in the downstream side of the first additional BOG compressor 56 on the nineteenth line L19, and a second pressure sensor 83 which measures pressure of the BOG flowing in the upstream side of the propulsion engine 21 on the first line L1. In this case, the pressure of the BOG flowing in the upstream side of the propulsion engine 21 on the first line L1 is the same as the pressure of the downstream side of the second additional BOG compressor 57 on the nineteenth line L19.

In this case, the controller 74 may receive pressure information about the BOG flowing in the downstream side of the first additional BOG compressor 56 on the nineteenth line L19 from the first pressure sensor 82 or receive pressure information about the BOG flowing in the upstream side of the propulsion engine 21 on the first line L1 from the second pressure sensor 83, and control the driving of the second BOG compressor 55 and the first and second additional BOG compressors 56 and 57 according to a pressure state of the BOG flowing in the downstream side of the first additional BOG compressor 56 on the nineteenth line L19 or a pressure state of the BOG flowing in the upstream side of the propulsion engine 21 on the first line L1, thereby flexibly responding to the state of the propulsion engine 21 and reliably re-liquefying the BOG through the BOG heat exchanger 521.

Particularly, the controller 74 receives the pressure information about the BOG flowing in the downstream side of the first additional BOG compressor 56 on the nineteenth line L19 from the first pressure sensor 82 in a wired or wireless form, and when the pressure of the BOG flowing in the downstream side of the first additional BOG compressor 56 on the nineteenth line L19 is larger than predetermined pressure, the controller 74 controls any one of the first and second additional BOG compressors 56 and 57 not to compress the BOG, and when the pressure of the BOG flowing in the downstream side of the first additional BOG compressor 56 on the nineteenth line L19 is smaller than the predetermined pressure, the controller 74 controls both the first and second additional BOG compressors 56 and 57 to compress the BOG.

Further, the controller 74 receives the pressure information about the BOG flowing in the upstream side of the propulsion engine 21 on the first line L1 from the second pressure sensor 83 in a wired or wireless form, and when the pressure of the BOG flowing in the upstream side of the propulsion engine 21 on the first line L1 is larger than predetermined pressure, the controller 74 controls any one of the first and second BOG compressors 54 and 55 not to compress the BOG, and when the pressure of the BOG flowing in the upstream side of the propulsion engine 21 on the first line L1 is smaller than the predetermined pressure, the controller 74 controls both the first and second BOG compressors 54 and 55 to compress the BOG.

Further, in the embodiment of the present invention, the controller 74 may control the driving of the first and second BOG compressors 56 and 57 according to an operation or a non-operation of the BOG heat exchanger 521.

Particularly, when the BOG heat exchanger 521 is operated, the controller 74 may control both the first and second BOG compressors 54 and 55 to compress the BOG, and when the operation of the BOG heat exchanger 521 is stopped, the controller 74 may control any one of the first and second BOG compressors 54 and 55 not to compress the BOG.

Herein, the non-compression control refers to a control in which the BOG compressor is driven by a piston (not illustrated), but both an intake valve (not illustrated) and an exhaust valve (not illustrated) are opened, so that the compression is not substantially performed.

Further, in the embodiment of the present invention, there may be further included first and second bypass lines BL1 and BL2 which bypass the BOG compressed by the second BOG compressor 55 and the first additional BOG compressor 56 from rear ends to front ends of the compressors, respectively. Herein, adjusting valves (not illustrated) may be provided on the first and second bypass lines BL1 and BL2, respectively, to perform a flow adjustment of the first and second bypass lines BL1 and BL2, and additionally, a third bypass line BL3 connected to the second bypass line BL2 in parallel may be further included. A block valve (not illustrated) may be provided on the third bypass line BL3.

In this case, the controller 74 may receive the pressure information about the BOG flowing in the downstream side of the first additional BOG compressor 56 on the nineteenth line L19 from the first pressure sensor 82 or receive the pressure information about the BOG flowing in the upstream side of the propulsion engine 21 on the first line L1 from the second pressure sensor 83, and control the flow of the BOG flowing on the first and second bypass lines BL1 and BL2 according to a pressure state of the BOG flowing in the downstream side of the first additional BOG compressor 56 on the nineteenth line L19 or a pressure state of the BOG flowing in the upstream side of the propulsion engine 21 on the first line L1, thereby flexibly responding to the state of the propulsion engine 21 and reliably re-liquefying the BOG through the BOG heat exchanger 521.

Particularly, the controller 74 receives the pressure information about the BOG flowing in the downstream side of the first additional BOG compressor 56 on the nineteenth line L19 from the first pressure sensor 82 in a wired or wireless form, and when the pressure of the BOG flowing in the downstream side of the first additional BOG compressor 56 on the nineteenth line L19 is larger than predetermined pressure, the controller 74 may control the BOG additionally compressed by the first additional BOG compressor 56 to bypass from the rear end to the front end of the first additional BOG compressor 56 through the second bypass line BL2, and when the pressure of the BOG flowing in the downstream side of the first additional BOG compressor 56 on the nineteenth line L19 is smaller than the predetermined pressure, the controller 74 may control the BOG additionally compressed by the first additional BOG compressor 56 to be supplied to the BOG heat exchanger 521.

Further, the controller 74 receives the pressure information about the BOG flowing in the upstream side of the propulsion engine 21 on the first line L1 from the second pressure sensor 83 in a wired or wireless form, and when the pressure of the BOG flowing in the upstream side of the propulsion engine 21 on the first line L1 is larger than predetermined pressure, the controller 74 may control the BOG additionally compressed by the second additional BOG compressor 55 to bypass from the rear end to the front end of the second additional BOG compressor 55 through the first bypass line BL1, and when the pressure of the BOG flowing in the upstream side of the propulsion engine 21 on the first line L1 is smaller than the predetermined pressure, the controller 74 may control the BOG compressed by the second BOG compressor 55 to be supplied to the propulsion engine 21 or the first additional BOG compressor 56.

Further, in the embodiment of the present invention, the controller 74 may control a flow of the BOG flowing on the first and second bypass lines BL1 and BL2 according to an operation or a non-operation of the BOG heat exchanger 521.

Particularly, when the BOG heat exchanger 521 is operated, the controller 74 may control the BOG additionally compressed by the first additional BOG compressor 56 to be supplied to the BOG heat exchanger 521, and when an operation of the BOG heat exchanger 521 is stopped, the controller 74 may control the BOG additionally compressed by the first additional BOG compressor 56 to bypass from the rear end to the front end of the first additional BOG compressor 56 through the second bypass line BL2.

Accordingly, the gas processing system 1 according to the embodiment of the present invention may minimize the operation of the BOG heat exchanger 521 and individually control the driving of the propulsion engine 21 and the BOG heat exchanger 521 by controlling the controller 74, thereby achieving an effect in that it is possible to very efficiently process the BOG.

The gas processing system 1 according to the embodiment of the present invention may have a technology in which at least a part of the compression stages of the BOG compressor 50 is controlled not to compress BOG according to an operation or a non-operation of the generation engine 22, thereby supplying the BOG to the generation engine 22 even without a separate decompressing means.

The gas processing system 1 according to an embodiment of the present invention described with reference to FIG. 2 may include a BOG compressor 50 which compresses BOG generated in a liquefied gas storage tank 10, a controller 75 which controls a plurality of compression stages of the BOG compressor 50 according to an operation or a non-operation of the generation engine 22, a first line L1 which connects the liquefied gas storage tank 10 and the propulsion engine 21 and is provided with the BOG compressor 50, and a seventh line L7 which is branched from the downstream side of the BOG compressor 50 on the first line L1 to be connected with the generation engine 22 as main configurations.

Particularly, in the gas processing system 1 according to the embodiment of the present invention, the liquefied gas storage tank 10 and the propulsion engine 21 may be connected through the first line L1, and the BOG compressor 50 may be provided on the first line L1 to supply the BOG compressed by the BOG compressor 50 to the propulsion engine 21.

Further, the gas processing system 1 according to the embodiment of the present invention may supply the BOG compressed by the BOG compressor 50 to the generation engine 22 through the seventh line L7 without a separate decompressing means.

In addition, in the embodiment of the present invention, there may be further included the controller 75 which controls the plurality of compression stages of the BOG compressor 50 by determining an operation or a non-operation of the generation engine 22, thereby controlling inflow fuel pressure of the generation engine 22.

The controller 75 may control at least a part of the stages among the compression stages of the BOG compressor 50 not to compress the BOG according to the operation or the non-operation of the generation engine 22.

Particularly, when only the generation engine 22 is operated and the propulsion engine 21 is not operate, the controller 75 may control only some of the plurality of compression stages of the BOG compressor 50 not to compress the BOG in accordance with required fuel pressure of the generation engine 22 and control the BOG to be supplied to the generation engine 22 through the seventh line L7 even without a separate decompressing means, and when the generation engine 22 is not operated and only the propulsion engine 21 is operated, the controller 75 may control all of the plurality of compression stages of the BOG compressor 50 to compress the BOG in accordance with the required fuel pressure of the propulsion engine 21 and control the BOG to be supplied to the propulsion engine 21.

As described above, in the embodiment of the present invention, it is possible to adjust the pressure of the BOG to the pressure required by the generation engine 22 and supply the BOG to the generation engine 22 through the controller 75 even without a separate decompressing means, thereby achieving the effects in that building cost is decreased and fuel may be flexibly supplied.

The gas processing system 1 according to the embodiment of the present invention may have a technology in which a twenty first line L21 that is an overpressure preventing line for preventing overpressure of the rear end of the BOG compressor 50 is shared with at least a part of the fourth line L4 which processes the BOG generated in the liquefied gas storage tank 10 during the loading or the unloading, thereby stably building the overpressure preventing line.

Figure 8:
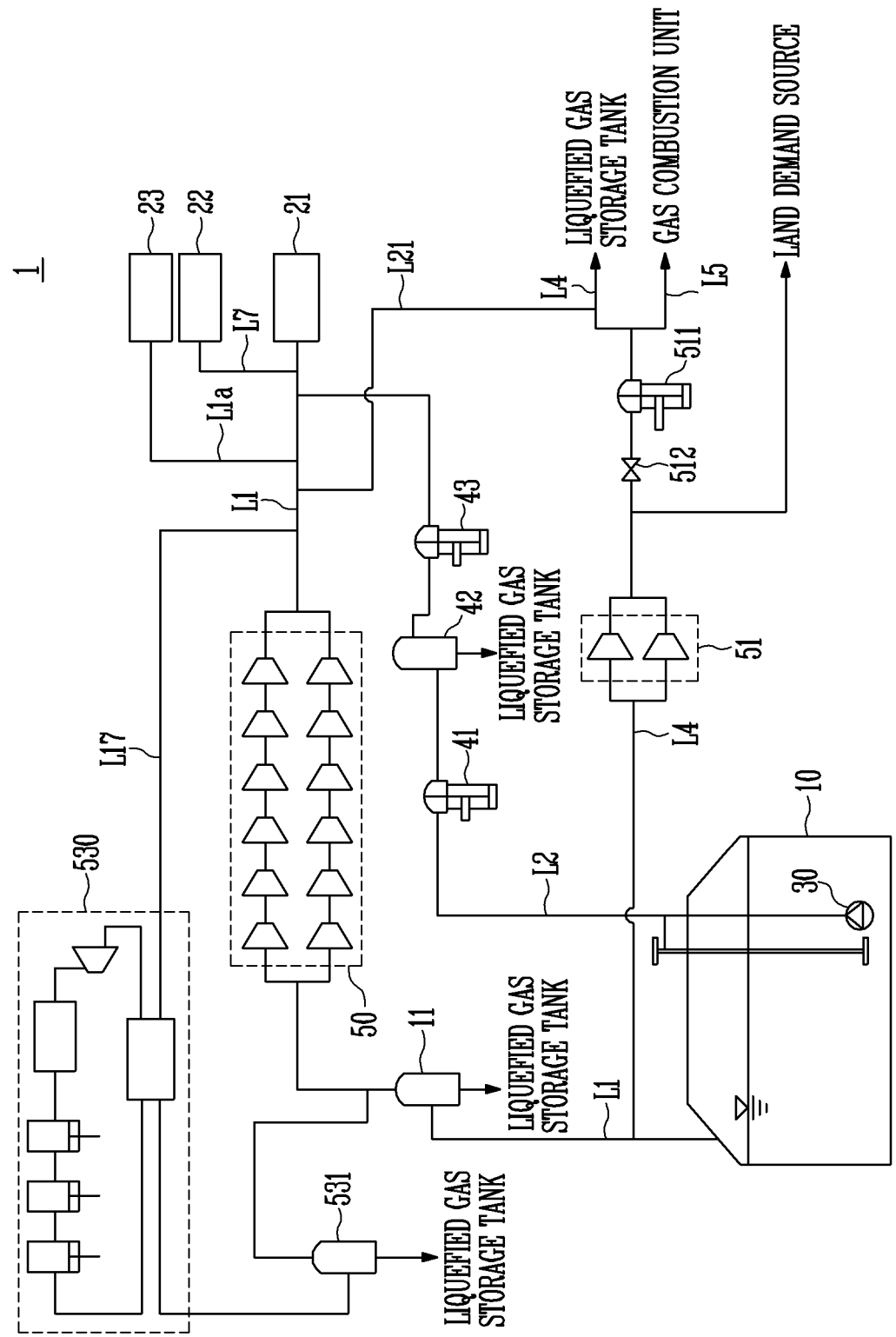
FIG. 8 is a concept diagram of a liquefied gas processing system according to an eighth embodiment of the present invention.

A gas processing system 1 according to the embodiment of the present invention described with reference to FIG. 8 may include a BOG compressor 50 which compresses the BOG generated in a liquefied gas storage tank 10, an 11/D compressor 51 which compresses the BOG generated in the liquefied gas storage tank 10 during loading or unloading, a second heater 511 which heats the BOG compressed by the H/D compressor 51, a first line L1 which connects the liquefied gas storage tank 10 and a propulsion engine 21 and is provided with the BOG compressor 50, a fourth line L4 which is connected so that the BOG generated in the liquefied gas storage tank 10 re-enters the liquefied gas storage tank 10 and is provided with the H/D compressor 51, and a twenty-first line L21 which is branched from a downstream side of the BOG compressor 50 on the first line L1 and is connected with a rear end of the second heater 511 on the fourth line L4 as the main configurations.

Particularly, in the gas processing system 1 according to the embodiment of the present invention, the liquefied gas storage tank 10 and the propulsion engine 21 are connected through the first line L1, and the BOG compressor 50 is provided on the first line L1. Further, in the embodiment of the present invention, the fourth line L4 may be connected so that the BOG generated in the liquefied gas storage tank 10 re-enters the liquefied gas storage tank 10 through the fourth line L4, and the H/D compressor 51 may be provided on the fourth line L4.

In addition, in the embodiment of the present invention, there may be further included the twenty-first line L21 which is branched from the downstream side of the BOG compressor 50 on the first line L1 and is connected with the rear end of the second heater 511 on the fourth line L4. That is, the twenty-first line L21 may be formed so as to share at least a part of the fourth line L4 which processes the BOG generated in the liquefied gas storage tank 10 during the loading or the unloading.

When overpressure is formed in the downstream side of the BOG compressor in the related art, an overpressure preventing line for preventing overpressure is separately provided and is connected to the liquefied gas storage tank. However, the BOG compressed by the BOG compressor has considerably higher internal compressor than that of the liquefied gas storage tank, so that when the BOG is returned to the liquefied gas storage tank as it is, there is a concern that the liquefied gas storage tank is damaged due to the overpressure, and thus it is designed so that the overpressure preventing line is formed to be very long and decompression is performed in the overpressure preventing line. Because of this, there is a problem in that building cost of the overpressure preventing line is very high in the related art.

In this respect, in the embodiment of the present invention, the overpressure preventing line is connected to the fourth line L4 so as to be at least partially shared with the fourth line L4 that is not used except for the loading time or the unloading time, like the twenty-first line L21, thereby decreasing system building cost and improving system safety.

Particularly, in the embodiment of the present invention, when the pressure of the downstream side of the BOG compressor 50 measured by a second pressure sensor 83 is larger than predetermined pressure, the BOG compressed by the BOG compressor 50 may be controlled to be supplied to the liquefied gas storage tank 10 through the twenty-first line L21, and the control may be performed by a separate controller (not illustrated), a valve (not illustrated) driven by the controller, and other devices (not illustrated) linked with the valve.

The gas processing system 1 according to the embodiment of the present invention may have a technology in which BOG compressed with high pressure by the BOG compressor 50 is directly supplied to the BOG heat exchanger 521, and BOG to be supplied to the propulsion engine 21 and the generation engine 22 is branched from a middle stage of the BOG compressor 50 and is prepared.

A gas processing system 1 according to an embodiment of the present invention described with reference to FIG. 5 may include a BOG compressor 50 which compresses BOG generated in the liquefied gas storage tank 10, a BOG heat exchanger 521 which heat exchanges at least one of the BOG generated in the liquefied gas storage tank 10, BOG additionally compressed by the BOG compressor 50, and BOG in a gas phase separated by a gas-liquid separator 522, the gas-liquid separator 522 which separates the BOG heat-exchanged by the BOG heat exchanger 521 into a gas phase and a liquid phase, an expansion valve 523 which decompresses or expands the BOG heat-exchanged by the BOG heat exchanger 521, a twenty-second line L22 which is connected to the liquefied gas storage tank 10 and is connected to the liquefied gas storage tank 10 again and is provided with the BOG compressor 50, the BOG heat exchanger 521, the gas-liquid separator 522, and the expansion valve 523, a twenty-third line L23 which is branched between a third compression stage and a fourth compression stage of the BOG compressor 50 on the twenty-second line L22 and is connected with a propulsion engine 21, a twenty-fourth line L24 which is branched between a second compression stage and the third compression stage of the BOG compressor 50 on the twenty-second line L22 and is connected with a generation engine 22, and a twenty-fifth line L25 which is branched from a downstream side of the BOG compressor 50 on the twenty-second line L22 and is connected to a space between the third compression stage and the fourth compression stage of the BOG compressor 50 as main configurations. Herein, the BOG heat exchanger 521 may heat exchange only the BOG generated in the liquefied gas storage tank 10 and the BOG compressed by the BOG compressor 50, but the present invention is not limited thereto.

In this case, the BOG compressor 50 may form the first to fifth compression stages from the upstream side to the downstream side based on a flow of the BOG, and final discharge pressure thereof may be designed to be 100 to 150 bars or 200 to 400 bars, not 15 to 20 bars.

For example, the BOG compressor 50 may pressurize the BOG to 1 to 3 bars in the first compression stage, 5 to 10 bars in the second compression stage, 15 to 20 bars in the third compression stage, 50 to 100 bars in the fourth compression stage, and 100 to 150 bars in the fifth compression stage.

Particularly, in the gas processing system 1 according to the embodiment of the present invention, the twenty-second line L22 is connected to the liquefied gas storage tank 10 and then is connected to the liquefied gas storage tank 10 again, and the BOG compressor 50, the BOG heat exchanger 521, the gas-liquid separator 522, and the expansion valve 523 are provided on the twenty-second line L22. That is, the BOG generated in the liquefied gas storage tank 10 is supplied to the BOG compressor 50 through the twenty-second line L22, and the BOG compressor 50 pressurizes the BOG generated in the liquefied gas storage tank 10 in multiple stages to pressurize the BOG to high pressure and supplies the pressurized BOG to the BOG heat exchanger 521, so that the BOG is re-liquefied in the BOG heat exchanger 52L In this case, the re-liquefied BOG is separated into a gas phase and a liquid phase by the gas-liquid separator 522, and the liquid phase may be returned to the liquefied gas storage tank 10 and the gas phase may be joined to the upstream side of the BOG compressor 50 on the twenty-second line L22.

Further, in the embodiment of the present invention, the BOG branched from the middle stage of the BOG compressor 50 may be supplied to the propulsion engine 21 through the twenty-third line L23, and the BOG branched from the middle stage of the BOG compressor 50 may be supplied to the generation engine 22 through the twenty-fourth line L24.

In this case, the twenty-third line L23 is branched between the third compression stage and the fourth compression stage of the BOG compressor 50 and is connected with the propulsion engine 21, so that it is possible to supply the BOG of 15 to 20 bars discharged from the third compression stage of the BOG compressor 50 to the propulsion engine 21, and the twenty-fourth line L24 is branched between the second compression stage and the third compression stage of the BOG compressor 50 and is connected with the generation engine 22, so that it is possible to supply the BOG of 5 to 10 bars discharged from the second compression stage of the BOG compressor 50 to the generation engine 22.

In addition, in the embodiment of the present invention, the BOG discharged from the final state of the BOG compressor 50 may be returned to the middle stage of the BOG compressor 50 through the twenty-fifth line L125.

In this case, the twenty-fifth line L25 is branched from the final stage of the BOG compressor 50 to be connected between the third compression stage and the fourth compression stage of the BOG compressor 50, so that it is possible to supply the BOG of 100 to 250 bars or 200 to 400 bars discharged from the final stage of the BOG compressor 50 to a space between the third compression stage and the fourth compression stage.

Particularly, the twenty-fifth line L25 is branched from the final stage of the BOG compressor 50 to be connected to the upstream side than the twenty-fourth line L24 in the space between the third compression stage and the fourth compression stage of the BOG compressor 50, so that when the amount of fuel required by the propulsion engine 21 is equal to or larger than a predetermined flow amount, it is possible to supply the BOG discharged from the final stage of the BOG compressor 50 to the twenty-fourth line L24.

Accordingly, the gas processing system 1 according to the embodiment of the present invention, the BOG of appropriate pressure may be supplied to the propulsion engine 21 or the generation engine 22 and simultaneously the BOG is re-liquefied in the BOG heat exchanger 521 even without an additional BOG compressor, thereby achieving an effect in that system building cost is decreased.

The present invention has been described in detail with reference to the exemplary embodiments, but the exemplary embodiments are illustrative and the present invention is not limited thereto. It is apparent that those skilled in the art may modify or improve the exemplary embodiments within the technical spirit of the present invention.

All of the simple modifications or changes of the present invention belong to the scope of the present invention, and the specific scope of the present invention may be apparent by the accompanying claims.

The invention claimed is:

1. A gas processing system, comprising:
a first demand source which consumes fuel of first pressure;
a second demand source which consumes fuel of second pressure that is lower than the first pressure;
a Boil Off Gas (BOG) compressor which has a capacity to compress BOG to required pressure of the first demand source and compresses BOG generated in a liquefied gas storage tank in multiple stages and supplies the BOG to the first demand source or the second demand source;
a first supply line which connects the liquefied gas storage tank and the first demand source and is provided with the BOG compressor; and
a second supply line which is branched from the first supply line, wherein the second supply line is connected with the second demand source,
wherein the second supply line is branched from the first supply line on a portion of the first supply line that is downstream side from the BOG compressor, and the second supply line delivers the BOG to the second demand source without using a separate decompressing means, and
a controller controls inflow fuel pressure of the second demand source when an event occurs, wherein the event is selected from the group consisting of the first demand source is erroneously operated and an operation of the first demand source is stopped.

2. The gas processing system of claim 1, wherein the controller determines a demand source, to which the BOG compressed by the BOG compressor is to be supplied, between the first demand source and the second demand source, and performs variable frequency drive control on the BOG compressor so that the BOG compressor discharges the BOG with a pressure selected from the group consisting of the first pressure and the second pressure.

3. The gas processing system of claim 2,
wherein when the event occurs, wherein the event is selcted from the group consisting of the first demand source is erroneously operated and operation of the first demand source is stopped, the controller performs the variable frequency drive control on the BOG compressor so as to discharge the BOG with the second pressure.

4. The gas processing system of claim 1, further comprising:
a third supply line which connects a rear end and a front end of the BOG compressor,
wherein the controller determines a demand source, to which the BOG compressed by the BOG compressor is to be supplied, between the first demand source and the second demand source, and controls a flow of liquefied gas flowing in a supply line selected from the group consisting the first supply line and the third supply line.

5. The gas processing system of claim 4, wherein when the event occurs, wherein the event is selected from the group consisting of the first demand source is erroneously operated and the operation of the first demand source is stopped, the controller controls at least a part of the BOG discharged from the BOG compressor to flow in the third supply line to make that pressure of the BOG discharged from the BOG compressor become the second pressure.

6. The gas processing system of claim 5, wherein
when the event occurs, wherein the event is selected from the group consisting of the first demand source is erroneously operated and the operation of the first demand source is stopped, the controller controls the remaining portion of the BOG discharged from the BOG compressor to be supplied to the second BOG supply line.

7. The gas processing system of claim 1, further comprising:
a flow amount control unit which is provided in an upstream side of the BOG compressor and controls a flow amount of the BOG flowing into the BOG compressor,
wherein the controller determines a demand source, to which the BOG compressed by the BOG compressor is to be supplied, between the first demand source and the second demand source, and controls the flow amount control unit so that the BOG compressor discharges the BOG with a pressure selected from the group consisting the first pressure and the second pressure.

8. The gas processing system of claim 7, wherein when the event occurs, wherein the event is selected frm the group consisting of the first demand source is erroneously operated or the operation of the first demand source is stopped, the controller controls the BOG compressor to discharge the BOG with the second pressure by operating the flow amount control unit so that the flow amount of the BOG flowing into the BOG compressor is decreased.

9. The gas processing system of claim 8, further comprising:
an adjusting valve which is provided in the downstream side of the BOG compressor,
wherein when the event occurs, wherein the event is selected from the group consisting of the first demand source is erroneously operated and the operation of the first demand source is stopped, the controller increases the degree of opening of the adjusting valve, operates the flow amount control unit, and enables the second demand source to receive the compressed BOG discharged from the BOG compressor which receives the decreased amount of BOG, and
when the first demand source is normally operated, the controller decreases the degree of opening of the adjusting valve, stops the operation of the flow amount control unit, and then enables the first demand source to receive the compressed BOG discharged from the BOG compressor.

10. The gas processing system of claim 1, further comprising:
a forcing vaporizer which is provided on the second supply line, and compulsorily vaporizes liquefied gas stored in the liquefied gas storage tank to generate Forced Boil Off Gas (FBOG),
wherein the BOG compressor has the capacity in which it is possible to process all of naturally generated BOG generated in the liquefied gas storage tank in a full load state as a maximum processing capacity.

11. The gas processing system of claim 1, wherein the case where the operation of the first demand source is stopped is a case where a vessel is anchored at a dock.

12. The gas processing system of claim 1, wherein the first demand source is a low-speed two-stroke low pressure injection engine.

13. A vessel comprising the gas processing system of claim 1.

14. The gas processing system of claim 1, further comprising:
   a third supply line which connects a rear end and a front end of the BOG compressor,
   wherein the controller determines a demand source, to which the BOG compressed by the BOG compressor is to be supplied, between the first demand source and the second demand source, and controls the BOG flowing in a supply line selected from the group consisting the first supply line and the third supply line.

* * * * *